US008721781B2

(12) United States Patent
Koganehira et al.

(10) Patent No.: US 8,721,781 B2
(45) Date of Patent: May 13, 2014

(54) INK COMPOSITION

(75) Inventors: Shuichi Koganehira, Matsumoto (JP); Shinichi Yamamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 95 days.

(21) Appl. No.: 13/417,687

(22) Filed: Mar. 12, 2012

(65) Prior Publication Data

US 2012/0227620 A1 Sep. 13, 2012

(30) Foreign Application Priority Data

Mar. 11, 2011 (JP) ................................. 2011-054261
Mar. 11, 2011 (JP) ................................. 2011-054262

(51) Int. Cl.
*C09D 11/14* (2006.01)

(52) U.S. Cl.
USPC .................. 106/31.36; 106/31.49; 106/31.58; 106/31.68; 106/31.78; 106/31.86

(58) Field of Classification Search
USPC .......... 106/31.36, 31.49, 31.58, 31.68, 31.78, 106/31.86
See application file for complete search history.

(56) References Cited

U.S. PATENT DOCUMENTS

| | | | | |
|---|---|---|---|---|
| 6,102,998 | A * | 8/2000 | Iu et al. | 106/31.58 |
| 6,153,107 | A | 11/2000 | Ogawa et al. | |
| 6,379,558 | B1 | 4/2002 | Ogawa et al. | |
| 6,715,868 | B2 | 4/2004 | Schmidt et al. | |
| 7,229,489 | B2 * | 6/2007 | Yatake | 106/31.58 |
| 7,537,652 | B2 * | 5/2009 | Koganehira et al. | 106/31.58 |
| 7,553,360 | B2 * | 6/2009 | Koganehira et al. | 106/31.58 |
| 7,686,876 | B2 * | 3/2010 | Koganehira et al. | 106/31.58 |
| 7,955,425 | B2 * | 6/2011 | Koganehira et al. | 106/31.58 |
| 8,021,472 | B2 * | 9/2011 | Koganehira et al. | 106/31.58 |
| 8,105,427 | B2 * | 1/2012 | Koganehira et al. | 106/31.58 |
| 8,110,033 | B2 * | 2/2012 | Mizutani et al. | 106/31.58 |
| 2003/0106462 | A1 | 6/2003 | Yatake et al. | |
| 2004/0020407 | A1 | 2/2004 | Kato | |
| 2005/0176848 | A1 | 8/2005 | Chen et al. | |
| 2005/0235870 | A1 * | 10/2005 | Ishihara | 106/31.58 |
| 2006/0196390 | A1 | 9/2006 | Rehman et al. | |
| 2007/0040880 | A1 * | 2/2007 | Jackson et al. | 106/31.68 |
| 2007/0247504 | A1 | 10/2007 | Koganehira et al. | |
| 2008/0233363 | A1 | 9/2008 | Goto | |
| 2008/0259100 | A1 | 10/2008 | Rengaswamy et al. | |
| 2009/0176071 | A1 | 7/2009 | Koganehira et al. | |
| 2009/0297716 | A1 | 12/2009 | Koganehira et al. | |
| 2010/0080962 | A1 | 4/2010 | Koganehira et al. | |
| 2010/0086685 | A1 * | 4/2010 | Mizutani et al. | 427/256 |
| 2010/0087595 | A1 * | 4/2010 | Koganehira et al. | 524/612 |
| 2010/0289848 | A1 | 11/2010 | Koganehira et al. | |
| 2010/0321430 | A1 * | 12/2010 | Koganehira et al. | 347/9 |
| 2011/0118399 | A1 * | 5/2011 | Koganehira et al. | 524/377 |
| 2011/0192317 | A1 * | 8/2011 | Koganehira | 106/31.9 |
| 2011/0265686 | A1 * | 11/2011 | Koganehira et al. | 106/31.13 |
| 2012/0073468 | A1 * | 3/2012 | Koganehira et al. | 106/31.13 |
| 2012/0227619 | A1 * | 9/2012 | Koganehira et al. | 106/31.13 |
| 2012/0227620 | A1 * | 9/2012 | Koganehira et al. | 106/31.13 |

FOREIGN PATENT DOCUMENTS

| | | |
|---|---|---|
| JP | H11-80629 A | 3/1999 |
| JP | 2003-213179 A | 7/2003 |
| JP | 2003-253167 A | 9/2003 |
| JP | 2004-526019 A | 8/2004 |
| JP | 2005-194500 A | 7/2005 |
| JP | 2005-226073 A | 8/2005 |
| JP | 2006-249429 A | 9/2006 |
| JP | 2007-277342 A | 10/2007 |
| JP | 2009-506166 A | 2/2009 |
| JP | 2009-209338 A | 9/2009 |
| JP | 2009-209339 A | 9/2009 |
| JP | 2009-209340 A | 9/2009 |
| WO | 02-066565 A1 | 8/2002 |
| WO | 2007024834 A1 | 3/2007 |
| WO | 2007-116902 A1 | 10/2007 |
| WO | 2008143086 A1 | 11/2008 |

* cited by examiner

*Primary Examiner* — Helene Klemanski

(74) *Attorney, Agent, or Firm* — Nutter McClennen & Fish LLP; John J. Penny, V.

(57) ABSTRACT

An ink composition includes a cyclic saccharide and hydantoin or a derivative thereof.

8 Claims, No Drawings

INK COMPOSITION

The entire disclosure of Japanese Application No.: 2011-054261 filed on Mar. 11, 2011 and 2011-054262 filed on Mar. 11, 2011 are expressly incorporated by reference herein.

BACKGROUND

1. Technical Field

The present invention relates to an ink composition from which high-quality recorded matter can be obtained by using various types of recording media, in particular, non-water-absorbing or low water-absorbing recording media such as synthetic paper and printing paper, and which has excellent clogging recoverability and re-dissolubility.

2. Related Art

Ink jet recording is a printing technique for forming a print by ejecting ink droplets and making the ink droplets adhere to a recording medium such as paper. Due to recent innovative advancement in ink jet recording technologies, ink jet recording is being increasingly employed in the field of high-definition printing that has previously been realized by silver halide photos and off-set printing. With this advancement, inks for ink jet recording have been developed which can produce images having glossiness of silver halide photos by using highly glossy recording media, i.e., special paper, comparable to the developing paper, art paper, and the like that have been used in the fields of silver halide photos and off-set printing. Moreover, inks for ink jet recording that can achieve the image quality of silver halide photos even when plain paper is used have also been developed.

Due to recent widespread of image-forming technologies using digital data, desk top publishing (DTP) has become popular in the fields of printing in particular. Even when printing is performed through DTP, a proof for correcting color is produced beforehand to confirm the gloss and color of actual prints. Ink jet recording is being applied to outputting of such proofs. In DTP, the print needs to have high color reproducibility and high color stability; thus, special paper for ink jet recording is normally used as recording media.

Proof paper, which is special paper for ink jet recording, is prepared such that a print made therefrom has the same gloss and color as those of an actually output print on printing paper. As such, the quality and material for special paper are appropriately adjusted according to the type of printing paper but it increases the production cost to make special paper that is compatible to many types of printing paper. Thus, for color proof usage, it is desirable from the technical viewpoint if ink jet recording can be performed on printing paper rather than special paper. If samples made by performing ink jet recording directly on printing paper without using special paper can be used as the final proof samples, the cost for proofing can be dramatically saved. Moreover, synthetic paper prepared by mixing inorganic fillers and the like with polyethylene resins, polypropylene resins, or polyester resins and forming the resulting mixtures into films is widely used in the field of printing and is attracting attentions as environmentally friendly products that have high recyclability. Thus, it is desirable from the environmental viewpoint if recording can be conducted on such synthetic paper.

Printing paper is coated paper having a coating layer for receiving oil-based inks on its surface and characteristically has a low water-absorbing property. Thus, when water-based pigmented inks commonly used in ink jet recording are used, the inks exhibit low permeability into the recording medium (printing paper) and bleeding or coalescence may occur in the images.

To address the problem described above, for example, Japanese Unexamined Patent Application Publication No. 2005-194500 (Patent Document 1) discloses a pigment-based ink that reduces bleeding and exhibits excellent glossiness on special paper, in which a polysiloxane compound is used as a surfactant and an alkanediol such as 1,2-hexanediol is used as a dissolving aid. Japanese Unexamined Patent Application Publication No. 2003-213179 (Patent Document 2), Japanese Unexamined Patent Application Publication No. 2003-253167 (Patent Document 3), and Japanese Unexamined Patent Application Publication No. 2006-249429 (Patent Document 4) propose that high-quality images can be obtained by controlling the permeability of inks into recording media through addition of glycerin, a diol such as 1,3-butanediol, or a triol alcohol solvent such as pentanetriol to inks. However, ink compositions that can create images of ever higher quality are still in pursuit.

Japanese Unexamined Patent Application Publication No. 2005-226073 (patent Document 5) discloses an ink composition containing 1,2-alkyldiol and a hydantoin derivative. The ink composition is stable when ejection is conducted at a high frequency and dries quickly once landed on a printing medium. However, this ink has completely different features and effects from those of the ink composition of the invention.

JP-T-2009-506166 (Patent Document 6) discloses an aqueous ink jet ink that contains a self-dispersing pigment and a plurality of humectants but does not disclose the features of the invention. The effects of the aqueous ink jet ink are completely different from those of the invention.

SUMMARY

A first finding of the inventors is that high-quality images can be formed on various recording media, in particular, non-water-absorbing or low water-absorbing recording media such as synthetic paper and printing paper, by using an ink composition that contains a cyclic saccharide and hydantoin or a derivative thereof and that such an ink composition offers good clogging recoverability and ink re-dissolubility.

A second finding of the inventors is that high-quality images with less bleeding or beading can be formed on various recording media, in particular, non-water-absorbing or low water-absorbing recording media such as synthetic paper and printing paper, by using an ink composition that contains a sparingly water-soluble alkanediol having 7 to 10 carbon atoms, a cyclodextrin, and a hydantoin or a derivative thereof and that such an ink composition offers good ink storage stability, clogging recoverability, and ink re-dissolubility.

Accordingly, a first advantage of the invention is to provide an ink composition that can form high-quality images on various recording media, in particular, non-water-absorbing or low water-absorbing recording media such as synthetic paper and printing paper, by containing a cyclic saccharide and hydantoin or a derivative thereof and that offers good clogging recoverability and ink re-dissolubility.

A second advantage of the invention is to provide an ink composition that can form high-quality images with less bleeding or beading on various recording media, in particular, non-water-absorbing or low water-absorbing recording media such as synthetic paper and printing paper and that offers good ink storage stability, clogging recoverability, and ink re-dissolubility.

A first aspect of the invention provides an ink composition including a cyclic saccharide and hydantoin or a derivative thereof.

A second aspect of the invention provides an ink composition including a sparingly water-soluble alkanediol having 7 to 10 carbon atoms, a cyclodextrin, and hydantoin or a derivative thereof.

According to the ink composition provided by the first aspect of the invention, an ink composition that can form high-quality images on various types or recording media, in particular, non-water-absorbing or low water-absorbing recording media such as synthetic paper and printing paper, and that offers good clogging recoverability and re-dissolubility can be provided.

According to the ink composition provided by the second aspect of the invention, an ink composition that can form high-quality images with less bleeding or beading on various types or recording media, in particular, non-water-absorbing or low water-absorbing recording media such as synthetic paper and printing paper, and that offers good ink storage stability, clogging recoverability and re-dissolubility can be provided.

DESCRIPTION OF EXEMPLARY EMBODIMENTS

Definitions

In this specification, the hydrocarbon moiety of an alkanediol may be linear or branched.

In this specification, "sparingly water soluble" means that the solubility (amount of a solute in 100 g of water) in water at 20° C. is less than 1.0 g. In this specification, "miscibility" means a property of a material capable of being evenly dispersed or dissolved without coalescing or phase separation when the solubility (amount of a solute in 100 g of water) in water at 20° C. is 10.0 g.

In this specification, a "non-water-absorbing or low water-absorbing recording medium" means a recording medium that has no aqueous-ink-receiving layer or a recording medium that has a poor aqueous-ink-receiving layer. Quantitatively, a non-water-absorbing or low water-absorbing recording medium is a recording medium having a recording surface that absorbs 10 mL/m$^2$ or less of water according to a Bristow method from onset of the contact up to 30 msecl/2. The Bristow method is the most prevalent method for measuring the amount of liquid absorbed in a short time and is employed in Japan Technical Association of the Pulp and Paper Industry (TAPPI). The details of the test method are described in Standard No. 51, "Method for determining the liquid absorbability of paper and board (Bristow's method)" in "JAPAN TAPPI Paper Pulp Test Methods, version 2000".

Embodiment A

Ink Composition

An ink composition according to an embodiment A of the invention contains a cyclic saccharide and hydantoin or a derivative thereof. When an ink composition that contains a cyclic saccharide and hydantoin or a derivative thereof is used, high-quality images can be formed on various recording media, in particular, non-water-absorbing or low water-absorbing recording media, and an ink composition that has excellent clogging recoverability and ink re-dissolubility can be provided.

When the ink composition of this embodiment is used on non-water-absorbing or low water-absorbing recording media, such as printing paper having a paper density of 73.3 to 209.2 g/m$^2$ and, in particular, thin printing paper having a paper density of 73.3 to 104.7 g/m$^2$, curling, i.e., inward warpage of a printed surface, can be suppressed. In particular, addition of a first saccharide and/or a second saccharide described below to the ink composition will improve the curling property.

Cyclic Saccharide

The ink composition of this embodiment contains a cyclic saccharide which is preferably a cyclodextrin. A cyclodextrin is a cyclic oligosaccharide and is preferably a type of compound that has a clathrate-forming ability. Cyclodextrins have basic skeletons constituted by glucose molecules bonded through α-1,4 glucoside bonds and are called α-cyclodextrin (six glucose molecules), β-cyclodextrin (seven glucose molecules), γ-cyclodextrin (eight glucose molecules), and δ-cyclodextrin (nine glucose molecules) according to the number of glucose molecules.

Cyclodextrins in general have a unique structure in which the outer side of the ring structure exhibits hydrophilicity and the inner side of the ring structure exhibits hydrophobicity (lipophilicity). Due to this unique structure, cyclodextrins are often capable of enclosing a lipophilic molecule smaller than the inner diameter of the ring structure to give a complex compound. Even when a molecule is larger than the inner diameter of the ring structure, as long as the molecule has a lipophilic portion smaller than the inner diameter of the ring structure, that portion often becomes enclosed in the cyclodextrin and a complex compound is formed as a result. The inner diameter of the cyclodextrins is, for example, 4.7 to 5.3 Å for α-cyclodextrin, 6.0 to 6.5 Å for β-cyclodextrin, and 7.5 to 8.3 Å for γ-cyclodextrin.

The cyclodextrins used in this embodiment are not particularly limited. For example, at least one selected from α-cyclodextrin, β-cyclodextrin, γ-cyclodextrin, and δ-cyclodextrin can be used. The cyclodextrins preferably have one or more substituents. Examples of the substituents of the cyclodextrins include an acyl group, a hydroxylalkyl group, an alkyl group, a glucosyl group, an amino group, and a carboxymethyl group. A cyclodextrin polymer crosslinked with a crosslinking agent such as epichlorohydrin or a polyvalent glycidyl ether, a branched cyclodextrin having a branched side chains such as glucose or mannose, a highly branched cyclic dextrin, etc., may also be used.

The cyclodextrins described above can be used alone or in combination of two or more. The substituent is preferably an alkyl group and more preferably a methyl group. In particular, methyl-β-cyclodextrin is preferred since it has a high solubility in water (30 mass % or more at 25° C.).

The method for making a cyclic saccharide is not particularly limited and is adequately selected based on the ease of production, the cost, the structure of the cyclic saccharide to be obtained, etc. An example of a method for making a cyclic saccharide having no substituents is a method of causing an enzyme from *Bacillus macerans* to act upon starch. An example of a method for making a substituted cyclic saccharide is a method in which a cyclic saccharide whose hydroxyl groups are partly deprotonated or a derivative thereof is used as an intermediate to carry out the reaction. The cyclodextrins that are preferred as the cyclic saccharide may be commercially available products. Examples thereof include CAVASOL and CAVAMAX (both produced by Wacker Chemie AG).

According to a preferred embodiment of the invention, the content of the cyclic saccharide may be adequately determined as long as the effects described above are achieved. However, the cyclic saccharide content relative to the entire ink composition is preferably 4.5 to 18.0 mass % and more preferably 4.5 to 9.0 mass %. The cyclic saccharide content is preferably within the above-described range, in particular, not below the lower limit, from the viewpoint of fixability to the film. The cyclic saccharide content is preferably within the above-described range, in particular, not beyond the upper limit, since the viscosity of the ink can be suppressed to a low level and precipitation of cyclic saccharide can be suppressed in a low-temperature environment. More preferably, the cyclic saccharide is a methylated β-cyclodextrin and the ink composition preferably contains 4.5 to 9.0 mass % of the cyclic saccharide.

Hydantoin and Hydantoin Derivative

The ink composition according to this embodiment contains a hydantoin or a derivative thereof. The hydantoin derivative used in the ink composition of this embodiment preferably remains in a solid state even when the derivative is left to stand still in a 20° C./60% RH environment for 24 hours and preferably has a melting point higher than the boiling point of water. The hydantoin derivative preferably has a solubility of 10.0 mass % or more and less than 30 mass % in 100 g of water at 20° C.

Hydantoin and a derivative thereof may be any as long as the effects of the invention are achieved. Examples thereof include hydantoin, allantoin, 5-hydantoinacetic acid, 1-methylhydantoin, 1-hydroxymethylhydantoin, 1-ethylhydantoin, 1-propylhydantoin, 1-isopropylhydantoin, 1-butylhydantoin, 3-methylhydantoin, 3-ethylhydantoin, 3-propylhydantoin, 3-butylhydantoin, 5-methylhydantoin, 5-ethylhydantoin, 5-propylhydantoin, 5-butylhydantoin, 1,3-dimethylhydantoin, 1,5-dimethylhydantoin, 3,5-dimethylhydantoin, 1,3-diethylhydantoin, 1,5-diethylhydantoin, 3,5-diethylhydantoin, 5,5-dimethylhydantoin, 1-hydroxymethyl-5,5-dimethylhydantoin, 1,3-bis(hydroxymethyl)-5,5-dimethylhydantoin, 1,3-bis(2-hydroxyethyl)-5,5-dimethylhydantoin, 1,3,5-trimethylhydantoin, 1,3,5-triethylhydantoin, 1-allylhydantoin, 1-phenylhydantoin, 3-phenylhydantoin, 5-phenylhydantoin, 1-(4-methylphenyl)hydantoin, 3-(4-methylphenyl)hydantoin, 1-(1-naphthyl)hydantoin, 1-(2-naphthyl) hydantoin, 3-(1-naphthyl)hydantoin, 3-(2-naphthyl) hydantoin, 1-benzylhydantoin, 3-benzylhydantoin, and 5-benzylhydantoin. In particular, 5,5-dimethylhydantoin and 1-hydroxymethyl-5,5-dimethylhydantoin are preferred from the viewpoints of solubility in water and melting point.

The ink composition containing hydantoin or a derivative thereof improves both clogging recoverability in an environment in which a head is capped and clogging recoverability in a high-temperature low-humidity environment. The reason for this is not clear. However, presumably, hydantoin or a derivative thereof has high crystallinity and high solubility for resin contained in the ink and thus can be locally dried and solidified without being trapped during drying and film-forming of the resin. Even after the resin in the ink is dried and forms a film, if the ink lands again on this dried film, locally dried and solidified hydantoin or a derivative thereof acts as a nucleus of redissolution, presumably resolving the clogging.

Hydantoin or a derivative thereof having poor solubility in water and a high melting point is more preferred since it solidifies before evaporation of water or resin film formation (MFT) and thus it is likely to dry and solidify locally. In particular, from the viewpoints of clogging recoverability and re-dissolubility, 5,5-dimethylhydantoin and 1-hydroxymethyl-5,5-dimethylhydantoin are preferable.

According to a preferred embodiment of the invention, the content of the hydantoin or a derivative thereof may be adequately determined as long as the effects described above are achieved. However, the content thereof relative to the entire ink composition is preferably 4.5 to 9.0 mass %. When the content of the hydantoin having a high melting point is within the above-described range, in particular, not below the lower limit, both clogging recoverability in an environment in which a head is capped and clogging recoverability in a high-temperature low-humidity environment can be improved. When the content of hydantoin or a derivative thereof is within the above-described range, in particular, not beyond the upper limit, the decrease in gloss can be suppressed.

Solid Humectant

The ink composition of this embodiment preferably contains a solid humectant that remains in a solid state even when it is left in a 20° C. 60% RH environment (such a solid humectant may hereinafter be simply referred to as "solid humectant"). A first saccharide and a second saccharide are the materials that may be contained in the solid humectant. The solid humectant preferably contains at least one selected from the group consisting of a first saccharide and a second saccharide. The first saccharide and the second saccharide are described below in details.

First Saccharide

A first saccharide preferred in this embodiment is a sugar that preferably remains in a solid state even when it is left to stand still in a 20° C. 60% RH environment for 24 hours. The moisture absorption from 20° C./60% RH to 20° C./80% RH is preferably 0 mass % or more and less than 10 mass %. The first saccharide preferably has a solubility of 30 mass % or more in 100 g of water at 20° C.

In this specification, the "moisture absorption from A° C./X % RH to B° C./Y % RH" is, for example, the value represented by the following equation:

$$(\text{Moisture absorption(mass \%)}) = 100 \times (M_{B\text{-}Y} - M_{A\text{-}X}) / M_{A\text{-}X}$$

$M_{A\text{-}X}$ is the mass after the material is left to stand still in a A° C., X % RH environment for 24 hours.

$M_{B\text{-}Y}$ is the mass after the material is left to stand still in a B° C., Y % RH environment for 24 hours.

The first saccharide is not particularly limited as long as the effects of the invention are achieved but is preferably at least one selected from the group consisting of trehalose, isotrehalose, neotrehalose, and mannitol. The first saccharide may be a trisaccharide or higher saccharide that contains a saccharide selected from trehalose, isotrehalose, and neotrehalose. An example thereof is a maltosyltrehalose containing trehalose and maltose. Among these, trehalose is preferable as the first saccharide.

Trehalose is a non-reducible disaccharide having 1,1-glucoside bonds between glucose units. Since trehalose is a non-reducible saccharide, browning due to the Maillard reaction does not occur, which is preferable from the viewpoint of ink storage stability. Moreover, trehalose has high solubility in water, high water retaining property, and notably low hygroscopicity. In particular, a high purity anhydrous trehalose has a significantly high solubility (69 g/100 g (20° C.)) in water but does not exhibit hygroscopicity at a humidity of 95% or less. Accordingly, when trehalose is brought into contact with water, it absorbs water and gives a gel. However, since trehalose does not show hygroscopicity in a normal environment (about 20° C. and 45% RH), trehalose can remain stable.

Isotrehalose and neotrehalose are non-reducible disaccharides having glucoside bonds. Since they are non-reducible saccharides, browning due to the Maillard reaction does not occur, which is preferable from the viewpoint of ink storage stability.

Examples of the commercially available products of the first saccharide include fine-power-type TREHA (produced by Hayashibara Shoji, Inc.), which is a commercially available trehalose, and D-mannitol (produced by Kao Chemical Corporation), which is a commercially available mannitol.

The first saccharide can be produced from starch sugar by a usual method such as a fermentation method, a hydrolysis method, a transglucosylation method, a condensation method, an epimerization (isomerization) method, or a chemical cross-linking method. Solidification can also be performed by a usual method. That is, it is possible to employ a method including spray-drying a massecuite, i.e., a solution containing a saccharide, a method including naturally drying massecuite to cause massecuite to crystallize and solidify in blocks and pulverizing the blocks, and a method including re-crystallizing a massecuite in a molten state by using seed crystals. The massecuite used may be any saccharide that can give a first saccharide having the low hygroscopicity described above and may contain two or more types of saccharides.

When an ink composition containing this first saccharide is used, beading caused by nonuniform flow that occurs in high-speed printing can be suppressed. Although the exact reason for this is not clear, the following can be presumed. The first saccharide contained in the ink composition adhering to a recording medium can form a gel (or solidify) by taking in water contained in the ink composition after adhering because the first saccharide has high solubility in water and high water retaining property. Thus, the gelled (or solidified) ink droplet exhibits suppressed flowability (flow nonuniformity). Moreover, according to the van't Hoff's law, inclusion of large amounts of water-soluble sugars increases the osmotic pressure and this may result in improvement of the penetration rate. High-speed printing is realized by suppression of beading and the color-reproducing region of prints is improved due to the increase in duty limitation value of the ink to be adhered to the recording medium.

Recorded matter obtained by using an ink composition containing the first saccharide can improve dewing resistance in a high-humidity environment at 20° C. and a humidity of about 60%.

In particular, the ink composition containing the first saccharide can improve the clogging recoverability in an environment (closed system) in which the head is capped. Although the reason for this is not clear, it is presumed that the ink composition remaining in the cap does not take away the moisture from the ink composition in the head because of its low hygroscopicity and this presumably improves the clogging recoverability in a capped (closed) system.

An ink composition containing the first saccharide prevents growth of ice crystals and thus improves the low-temperature storage stability of the ink.

According to a preferred embodiment of the invention, the first saccharide content may be adequately used as long as the effects described above are achieved. However, the content thereof relative to the entire ink composition is preferably 3.0 to 9.0 mass %. The first saccharide content is preferably within the above-described range, in particular, not below the lower limit, to improve the clogging recoverability in the aforementioned environment and from a viewpoint of gloss. When the amount of the first saccharide is within the above described range, in particular, not beyond the upper limit, the initial viscosity of the ink is prevented from becoming excessively high and the freezing point is lowered, which is preferable from the viewpoint of low-temperature storage property of the ink. Curling, i.e., inward warpage of a printed surface, can be significantly suppressed even when thin printing paper having a paper density of 73.3 g/m² is used or paper for plain paper copy (PPC) is used. Although the exact reason for this is not clear, the following can be presumed. Cellulose is a long chain-like saccharide constituted by linked (polymerized) monosaccharides. Curling occurs when hydrogen bonds between cellulose units are cut by water molecules and hydrogen bonds between the cellulose units are regenerated in sites different from the sites of the cut hydrogen bonds between the cellulose units as water evaporates. Thus, in order to suppress curling, regeneration of hydrogen bonds between cellulose units should be inhibited as rapidly as possible after evaporation of water. The substance effective as this inhibitor is a crystalline saccharide having a molecular structure similar to cellulose and is preferably trehalose, isotrehalose, or neotrehalose that has excellent drying property and re-crystallizability.

Second Saccharide

A second saccharide preferred in this embodiment is a sugar that preferably remains in a solid state even when it is left to stand still in a 20° C. 60% RH environment for 24 hours. The moisture absorption from 20° C./60% RH to 20° C./80% RH is preferably 10 mass % or more and 30 mass % or less. The second saccharide preferably has a solubility of 30 mass % or more in 100 g of water at 20° C.

The second saccharide is not particularly limited as long as the effects of the invention are achieved. Examples thereof include linear maltooligosaccharides that have $\alpha$-1,4 bonds only, such as maltose, maltotriose, maltotetraose, maltopentaose, maltohexaose, maltoheptaose, maltooctaose, maltononaose, and maltodecaose; and branched maltooligosaccharides having $\alpha$-1,6 bonds in a molecule obtained from the branched portions of amylopectin such as isomaltose, panose (glucosyl maltose), and glucosyl maltotriose. Other examples include maltitol, sorbitol, xylitol, erythritol, and sucrose. Among these, at least one selected from the group consisting of maltotriose, maltotetraose, and maltopentaose is preferred due to high hygroscopicity. Maltotriose is particularly preferable. Reduced sugars of these may also be used.

Examples of the commercially available products of the second saccharide include Oligotose (Sanwa Cornstarch Co., Ltd.), which is a commercial product of maltotriose, Sunmalt (produced by Hayashibara Shoji, Inc.), which is a commercial product of maltose, MABIT (produced by Hayashibara Shoji, Inc.) and crystal MABIT (produced by Hayashibara Shoji, Inc.), which are commercial products of maltitol, and commercial products of crystal erythritol produced by Nikken Chemical Laboratory Co., Ltd., Mitsubishi-Kagaku Foods Corporation, Celestare, and Cargill.

The second saccharide can be produced by a usual method as with the first saccharide.

The ink composition containing the second saccharide can improve the clogging recoverability in a low-humidity environment (open system). The reason for this is not clear but it is presumed that because the second saccharide has high hygroscopicity, it can take in moisture from air even in a low-humidity environment, resulting in high clogging recoverability. Accordingly, stable recording can be realized over a long term without capping the head, for example.

According to a preferred embodiment of the invention, the second saccharide content may be adequately determined as long as the effects described above are achieved. However, the content thereof relative to the entire ink composition is preferably 3.0 to 9.0 mass %. The content of the second saccharide having high hygroscopicity is preferably within the above-described range, in particular, not below the lower limit, to improve the clogging recoverability in the high-temperature high-humidity open environment and from a viewpoint of gloss. When the second saccharide content is within the above described range, in particular, not beyond the upper limit, the glass transition temperature Tg of the ink film is prevented from becoming excessively high and the flexibility can be imparted. This is preferred from the viewpoint of ink fixability. This is also preferred since the first saccharide having good drying property and re-crystallizability can be prevented from depositing in the waste-liquid portion of a printer.

According to a preferred embodiment of the invention, the ink composition preferably contains 4.5 to 13.5 mass % of the solid humectant.

According to another preferred embodiment of the invention, the total content of the first and second saccharides is preferably 6.0 to 18.0 mass % relative to the entire ink composition. When the total content is within this range, the clogging recoverability can be improved.

The ratio of the content of the first saccharide to the content of the second saccharide is not particularly limited but is preferably 1:5 to 5:1.

This range is preferred since the clogging recoverability in a closed system can be improved and the flowability of the waste ink can be ensured.

According to a preferred embodiment of the invention, the solid humectant contains at least one selected from the group consisting of a first saccharide and a second saccharide. The first saccharide is preferably at least one selected from the group consisting of trehalose, isotrehalose, neotrehalose, and mannitol. The second saccharide is preferably at least one selected from the group consisting of maltotriose, maltotetraose, and maltopentaose. Because a first saccharide having low hygroscopicity and a second saccharide having high hygroscopicity are both contained as solid humectants in the ink composition, clogging recoverability in a closed system is high despite inclusion of the highly hygroscopic second saccharide and the clogging recoverability in an open system is high despite inclusion of the low-hygroscopic first saccharide. That is, since the ink composition contains both the first saccharide and the second saccharide, the effects of these saccharides are achieved without impairing the clogging recoverability in the open system and the clogging recoverability in the closed system. Such an effect is newly discovered.

Water-Soluble Alkanediol

An ink composition according to a preferred embodiment of the invention may contain a water-soluble alkanediol in addition to the cyclic saccharide and hydantoin or a derivative thereof.

According to a preferred embodiment of the invention, a water-soluble alkanediol has one or both ends terminated with hydroxyl groups and preferably has a branched chain. The water-soluble alkanediol is preferably an alkanediol having 3 or more carbon atoms and more preferably 3 to 6 carbon atoms. The water-soluble alkanediol contained in the ink composition is preferably 2-methyl-1,3-propanediol, 3-methyl-1,5-pentanediol, 1,5-pentanediol, 1,2-hexanediol, or 1,6-hexanediol and more preferably a water-soluble hexanediol such as 1,2-hexanediol or 1,6-hexanediol. Among these, 1,2-hexanediol is preferred. The water-soluble alkanediol may be 1,6-hexanediol since it offers good discharge stability at high frequencies.

Coloring Material

The ink composition may contain a coloring material. The colorant may be a dye or a pigment but is preferably a pigment from the viewpoints of light-fastness and water resistance. The coloring material preferably contains the pigment and the dispersant below which can make the pigment disperse in the ink.

The pigment may be organic or inorganic and one or more types of pigments may be used. Examples of the inorganic pigment include titanium oxide, iron oxide, and carbon black produced by known methods such as a contact method, a furnace method, and a thermal method. Examples of the organic pigment include azo pigments (azo lakes, insoluble azo pigments, condensed azo pigments, chelate azo pigments, etc.), polycyclic pigments (e.g., phthalocyanine pigments, perylene pigments, perinone pigments, anthraquinone pigments, quinacridone pigments, dioxazine pigments, thioindigo pigments, isoindolinone pigments, quinophthalone pigments, etc.), dye chelates (e.g., basic dye chelates, acidic dye chelates, etc.), nitro pigments, nitroso pigments, and aniline black.

Specific examples of the pigments can be provided according to the type (color) of the ink composition to be obtained. Examples of the pigments for an yellow ink composition include C.I. Pigment Yellow 1, 2, 3, 12, 14, 16, 17, 73, 74, 75, 83, 93, 95, 97, 98, 109, 110, 114, 128, 129, 138, 139, 147, 150, 151, 154, 155, 180, and 185. They may be used alone or in combination. Among these, at least one selected from the group consisting of C.I. Pigment Yellow 74, 110, 128, and 129 is preferably used. Examples of the pigments for a magenta ink composition include C.I. Pigment Red 5, 7, 12, 48(Ca), 48(Mn), 57(Ca), 57:1, 112, 122, 123, 168, 184, 202, and 209; and C.I. Pigment Violet 19. They may be used alone or in combination. Among these, at least one selected from the group consisting of C.I. Pigment Red 122, 202, and 209 and C.I. Pigment Violet 19 is preferably used. They may be used alone or in combination and may be a solid solution. Examples of the pigments for a cyan ink composition include C.I. Pigment Blue 1, 2, 3, 15:2, 15:3, 15:4, 15:34, 16, 22, and 60; and C.I. Vat Blue 4 and 60. They may be used alone or in combination. Among these, C.I. Pigment blue 15:3 and/or 15:4 is preferably used, and C.I. Pigment Blue 15:3 is particularly preferably used.

Examples of the pigment for a black ink composition include inorganic pigments including carbons such as lampblack (C.I. Pigment Black 6), acetylene black, furnace black (C.I. Pigment Black 7), channel black (C.I. Pigment Black 7), carbon black (C.I. Pigment Black 7) and the like and iron oxide pigments; and organic pigments such as aniline black (C.I. Pigment Black 1). In a preferred embodiment, carbon black is preferably used. Specific examples of the carbon black include #2650, #2600, #2300, #2200, #1000, #980, #970, #966, #960, #950, #900, #850, MCF-88, #55, #52, #47, #45, #45L, #44, #33, #32, and #30 (products of Mitsubishi Chemical Corporation up to here), SpecialBlack 4A and 550, Printex 95, 90, 85, 80, 75, 45, and 40 (products of Degussa Corporation up to here), Regal 660, RmogulL, monarch 1400, 1300, 1100, 800, and 900 (products of Cabot Corporation up to here), Raven 7000, 5750, 5250, 3500, 2500 ULTRA, 2000, 1500, 1255, 1200, 1190 ULTRA, 1170, 1100 ULTRA, and Raven 5000 UIII (products of Columbian Chemicals Company up to here).

The concentration of the pigment is not particularly limited since the pigment concentration (content) can be adequately adjusted while preparing the ink composition. For example, when the pigment concentration is 1 to 4%, an image having suppressed granularity can be obtained. When the pigment concentration is 4 to 12%, an image having a good coloring property can be obtained.

The pigments described above are preferably pigments kneaded with dispersants described below since the glossiness of the image, bronzing prevention, and the storage stability of the ink composition can all be achieved while a color image having higher glossiness can be formed.

Dispersant

The ink composition preferably contains at least one resin that serves as a dispersant for dispersing the coloring material, the at least one resin being selected from a styrene-acrylic acid copolymer resin, an oxyethyl acrylate resin, a urethane resin, and a fluorene resin. More preferably, the ink composition contains at least one resin selected from an oxyethyl acrylate resin and a fluorene resins. These copolymer resins adsorb to the pigment and improve the dispersibility.

Specific examples of hydrophobic monomers for the copolymer resins include methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, sec-butyl acrylate, sec-butyl methacrylate, tert-butyl acrylate, tert-butyl methacrylate, n-hexyl acrylate, n-hexyl methacrylate, n-octyl acrylate, n-octyl methacrylate, iso-octyl acrylate, iso-octyl methacrylate, 2-ethylhexyl acrylate, 2-ethylhexyl methacrylate, decyl acrylate, decyl methacrylate, lauryl acrylate, lauryl methacrylate, stearyl acrylate, stearyl methacrylate, 2-hydroxyethyl acrylate, 2-hydroxyethyl methacrylate, 2-hydroxypropyl acrylate, 2-hydroxypropyl methacrylate, 2-dimethylaminoethyl acrylate, 2-dimethylaminoethyl methacrylate, 2-diethylaminoethyl acrylate, 2-diethylaminoethyl methacrylate, glycidyl acrylate, glycidyl methacrylate, allyl acrylate, allyl methacrylate, cyclohexyl acrylate, cyclohexyl methacrylate, phenyl acrylate, phenyl methacrylate, nonylphenyl acrylate, nonylphenyl methacrylate, benzyl acrylate, benzyl methacrylate, dicyclopentenyl acrylate, dicyclopentenyl methacrylate, bornyl acrylate, bornyl methacrylate, 1,3-butanediol diacrylate, 1,3-butanediol dimethacrylate, 1,4-butanediol diacrylate, 1,4-butanediol dimethacrylate, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol diacrylate, tetraethylene glycol dimethacrylate, polyethylene glycol diacrylate, polyethylene glycol dimethacrylate, neopentyl glycol diacrylate, 1,6-hexanediol diacrylate, 1,6-hexanediol dimethacrylate, dipropylene glycol diacrylate, dipropylene glycol dimethacrylate, trimethylolpropane triacrylate, trimethylolpropane trimethacrylate, glycerol acrylate, glycerol methacrylate, styrene, methylstyrene, vinyl toluene, and ortho-hydroxyethylated phenylphenol acrylate. These may be used alone or in combination.

Specific examples of the hydrophilic monomer include acrylic acid, methacrylic acid, maleic acid, and itaconic acid.

The copolymer resin of the hydrophobic monomer and the hydrophilic monomer described above is preferably one of a styrene-(meth)acrylic acid copolymer resin, a styrene-methylstyrene-(meth)acrylic acid copolymer resin, a styrene-maleic acid copolymer resin, a (meth)acrylic acid-(meth)acrylic acid ester copolymer resin, a styrene-(meth)acrylic acid-(meth)acrylic acid ester copolymer resin, and an ortho-hydroxyethylated phenylphenol acrylate-(meth)acrylic acid copolymer resin from viewpoints of achieving bronzing prevention and storage stability of the ink composition and forming a color image having better glossiness.

The copolymer resin may be a resin (styrene-acrylic acid resin) that contains a polymer obtained by a reaction of styrene with acrylic acid or an acrylic acid ester. Alternatively, the copolymer resin may be an acrylic acid-based water-soluble resin. Alternatively, their salts of sodium, potassium, ammonium, triethanolamine, triisopropanolamine, triethylamine, and diethanolamine may be used.

The acid value of the copolymer resin is preferably 50 to 320 and more preferably 100 to 250 from viewpoints of achieving bronzing prevention and storage stability of the ink composition and forming a color image having better glossiness.

The weight-average molecular weight (Mw) of the copolymer resin is preferably 2,000 to 30,000 and more preferably 2,000 to 20,000 from viewpoints of achieving bronzing prevention and storage stability of the ink composition and forming a color image having better glossiness.

The glass transition temperature (Tg, measured in accordance with Japanese Industrial Standards K6900) of the copolymer resin is preferably 30° C. or more and more preferably 50° C. to 130° C. from viewpoints of achieving bronzing prevention and storage stability of the ink composition and forming a color image having better glossiness.

In the pigment dispersion, the copolymer resin is adsorbed to the pigment in some cases and is left free in other cases. The maximum particle diameter of the copolymer resin is preferably 0.3 μm or less and the average particle diameter is preferably 0.2 μm or less (more preferably 0.1 μm or less) from viewpoints of achieving bronzing prevention and storage stability of the ink composition and forming a color image having better glossiness. The average particle diameter refers to an average of the dispersion diameter (accumulated 50% diameter) of particles of the pigment in the actual dispersion and can be measured with, e.g., Micro Track UPA (produced by Microtrac Inc.).

The copolymer resin content is preferably 20 to 50 parts by mass and more preferably 20 to 40 parts by mass relative to 100 parts by mass of the pigment from viewpoints of achieving bronzing prevention and storage stability of the ink composition and forming a color image having better glossiness.

An oxyethyl acrylate resin may be used as the copolymer resin. An oxyethyl acrylate resin is preferable since it decreases the initial viscosity of the ink, improves storage stability at high temperatures, and offers good clogging recoverability.

The oxyethyl acrylate resin is not particularly limited as long as it is a resin having an oxyethyl acrylate backbone but is preferably a compound represented by formula (I) below. Examples of the compound represented by formula (I) include a resin that contains, in terms of monomer molar ratio, 45% to 55% ortho-hydroxyethylated phenylphenol acrylate of CAS No. 72009-86-0, 20% to 30% acrylic acid of CAS No. 79-10-7, and 20% to 30% methacrylic acid of CAS No. 79-41-4. These may be used alone or in combination. Although the monomer composition ratio is not particularly limited, the content of the ortho-hydroxyethylated phenylphenol acrylate of CAS No. 72009-86-0 is preferably 70 to 85 mass %, the content of acrylic acid of CAS No. 79-10$^{-7}$ is preferably 5 to 15 mass %, and the content of methacrylic acid of CAS No. 79-41-4 is preferably 10 to 20 mass %.

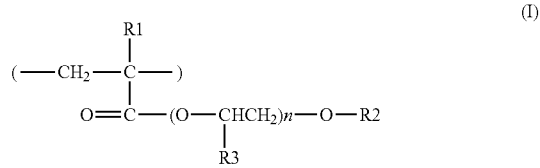

(I)

(where R1 and/or R3 represents a hydrogen atom or a methyl group, R2 represents an alkyl group or an aryl group, and n represents an integer of 1 or more).

The compound represented by formula (I) is preferably nonylphenoxy polyethylene glycol acrylate or polypropylene glycol #700 acrylate.

The oxyethyl acrylate resin content is preferably 10 to 40 parts by mass and more preferably 15 to 25 parts by mass relative to 100 parts by mass of the pigment from viewpoints of achieving initial viscosity of the ink composition, storage stability of the ink composition, suppression of the coalescence, and formation of color images having good filling property.

The total of the ratios of the resins derived from hydroxyl-containing monomers selected from acrylic acid and methacrylic acid in the oxyethyl acrylate resin is preferably 30% to 70% and more preferably 40% to 60% of the oxyethyl acrylate resin from the viewpoints of achieving the initial viscosity of the ink composition, the storage stability of the ink composition, and the clogging recoverability.

The number-average molecular weight (Mn) of the oxyethyl acrylate resin before crosslinking is preferably 4000 to 9000 and more preferably 5000 to 8000 from the viewpoints of initial viscosity of the ink composition and the storage stability of the ink composition. Mn is measured by, for example, gel permeation chromatography (GPC).

In the pigment dispersion, the oxyethyl acrylate resin is adsorbed to the pigment in some cases and left free in other cases. The maximum particle diameter of the copolymer resin is preferably 0.3 µm or less, and the average particle diameter is preferably 0.2 µm or less (more preferably 0.1 µm or less) from the viewpoints of achieving bronzing prevention and storage stability of the ink composition and forming a color image having better glossiness. The average particle diameter refers to an average of the dispersion diameter (accumulated 50% diameter) of particles of the pigment in the actual dispersion and can be measured with, e.g., Micro Track UPA (produced by Microtrac Inc.).

The oxyethyl acrylate resin content is preferably 20 to 50 parts by mass and more preferably 20 to 40 parts by mass relative to 100 parts by mass of the pigment from viewpoints of achieving bronzing prevention and storage stability of the ink composition and forming a color image having better glossiness.

When a urethane resin is used as a pigment dispersant for fixing, bronzing prevention and storage stability of the ink composition can be achieved and a color image having better glossiness can be formed. A urethane resin is a resin containing a polymer obtained by reacting a diisocyanate compound and a diol compound. The urethane resin is preferably a resin having a urethane bond and/or an amide bond, and an acidic group.

Examples of the diisocyanate compound include araliphatic diisocyanate compounds such as hexamethylene diisocyanate and 2,2,4-trimethylhexamethylene diisocyanate, aromatic diisocyanate compounds such as toluoylene diisocyanate and phenylmethane diisocyanate, and denaturated products thereof.

Examples of the diol compounds include polyethers such as polyethylene glycol and polypropylene glycol, polyesters such as polyethylene adipate and polybutylene adipate, and polycarbonates.

The acid value of the urethane resin is preferably 10 to 300 and more preferably 20 to 100 from viewpoints of achieving bronzing prevention and storage stability of the ink composition and forming a color image having better glossiness. The acid value is an amount (in terms of mg) of KOH needed to neutralize 1 g of resin.

The weight-average molecular weight (Mw) of the urethane resin before crosslinking is preferably 100 to 200,000 and more preferably 1,000 to 50,000 from viewpoints of achieving bronzing prevention and storage stability of the ink composition and forming a color image having better glossiness. Mw is measured by, for example, gel permeation chromatography (GPC).

The glass transition temperature (Tg, measured in accordance with Japanese Industrial Standards K6900) of the urethane resin is preferably −50° C. to 200° C. and more preferably −50° C. to 100° C. from viewpoints of achieving bronzing prevention and storage stability of the ink composition and forming a color image having better glossiness.

The urethane resin preferably contains a carboxyl group.

The urethane resin content is preferably 20 to 50 parts by mass and more preferably 20 to 40 parts by mass relative to 100 parts by mass of the pigment from viewpoints of achieving bronzing prevention and storage stability of the ink composition and forming a color image having better glossiness.

A fluorene resin may be used as a fixing pigment dispersant. A fluorene resin is preferable since it decreases the initial viscosity of the ink, improves storage stability at high temperatures, and offers good fixability to printing paper.

The fluorene resin may be any resin that has a fluorene backbone and, for example, can be obtained by copolymerizing the following monomer units.

5-isocyanato-1-(isocyanatomethyl)-1,3,3-trimethylcyclohexane (CAS No. 4098-71-9)

2,2'-[9H-fluoren-9-ylidenebis(4,1-phenyleneoxy)]bisethanol (CAS No. 117344-32-8)

3-hydroxy-2-(hydroxymethyl)-2-methylpropionic acid (CAS No. 4767-03-7)

N,N-diethyl-ethanamine (CAS No. 121-44-8)

The monomer composition ratio of the fluorene resin is not particularly limited as long as the resin has a fluorene backbone but is preferably 35 to 45 mass % 5-isocyanato-1-(isocyanatomethyl)-1,3,3-trimethylcyclohexane (CAS No. 4098-71-9), 40 to 60 mass % 2,2'-[9H-fluoren-9-ylidenebis(4,1-phenyleneoxy)]bisethanol (CAS No. 117344-32-8), 5 to 15 mass % 3-hydroxy-2-(hydroxymethyl)-2-methyl propionic acid (CAS No. 4767-03-7), and 5 to 15 mass % N,N-diethyl-ethanamine (CAS No. 121-44-8).

The number-average molecular weight (Mn) of the fluorene resin before crosslinking is preferably 2000 to 5000 and more preferably 3000 to 4000 from the viewpoints of initial viscosity of the ink composition and the storage stability of the ink composition. Mn is measured by, for example, gel permeation chromatography (GPC).

In the pigment dispersion, the fluorene resin is adsorbed on the pigment in some cases and left free in other cases. The maximum particle diameter of the copolymer resin is preferably 0.3 µm or less and the average particle diameter is preferably 0.2 µm or less (more preferably 0.1 µm or less) from the viewpoints of achieving bronzing prevention and storage stability of the ink composition and forming a color image having better glossiness. The average particle diameter refers to an average of the dispersion diameter (accumulated 50% diameter) of particles of the pigment in the actual dispersion and can be measured with, e.g., Micro Track UPA (produced by Microtrac Inc.).

The fluorene resin content is preferably 20 to 50 parts by mass and more preferably 20 to 40 parts by mass relative to 100 parts by mass of the pigment from viewpoints of achieving bronzing prevention and storage stability of the ink composition and forming a color image having better fixability.

The ratio of the mass of the copolymer resin to the mass of the fixing pigment dispersant is preferably 1/2 to 2/1 but is more preferably 1/1.5 to 1.5/1 from viewpoints of achieving bronzing prevention and storage stability of the ink composition and forming a color image having better glossiness.

The ratio of the mass of the solid content of the pigment to the total solid content of the copolymer resin and the fixing pigment dispersant is preferably 100/40 to 100/100 from viewpoints of achieving bronzing prevention and storage stability of the ink composition and forming a color image having better glossiness.

A surfactant may be used as the dispersant. Examples of the surfactant include anionic surfactants such as fatty acid salts, higher alkyl dicarboxylic acid salts, higher alcohol sulfuric acid ester salts, higher alkyl sulfonic acid salts, condensates of higher fatty acids and amino acids, sulfosuccinic acid ester salts, naphthenic acid salts, liquid fatty oil sulfuric acid ester salts, and alkyl allyl sulfonic acid salts; cationic surfactants such as fatty acid amine salts, quaternary ammonium salts, sulfonium salts, and phosphonium salts; and nonionic surfactants such as polyoxyethylene alkyl ethers, polyoxyethylene alkyl esters, sorbitan alkyl esters, and polyoxyethylene sorbitan alkyl esters. When the surfactant is added as the dispersant to the ink composition, it naturally serves as a surfactant also.

Surfactant

The ink composition may contain a surfactant. When a surfactant is used with a recording medium having a surface coated with a resin for receiving the ink, an image having good glossiness can be formed on a recording medium, such as photographic paper, that particularly requires good glossiness. In particular, bleeding between colors can be prevented and whitening caused by reflected light generated as the amount of adhered inks increases can be prevented even when a recording medium, such as printing paper, including a coating layer for receiving oil-based inks on its surface is used.

Polyorganosiloxane surfactants are preferred as the surfactant used in the ink composition. In forming an image to be recorded, the wettability to the recording medium surface is increased and the permeability of the ink can be increased. In the case where a polyorganosiloxane surfactant is used, the solubility of the surfactant in the ink improves and generation of the insoluble matter or the like can be suppressed. Thus, an ink composition having a higher ejection stability can be realized.

The polyorganosiloxane surfactant is not particularly limited but preferably has a dynamic surface tension of 26 mN/m or less at 1 Hz when prepared into an aqueous solution containing 20 mass % glycerin, 10 mass % 1,2-hexanediol, 0.1 mass % polyorganosiloxane surfactant, and 69.9 mass % water. The dynamic surface tension can be measured with, for example, a bubble pressure tensiometer BP2 (product of KRUSS GmbH).

Commercially available products may be used as the surfactant. For example, Olfine PD-501 and Olfine PD-570 (products of Nissin Chemical Industry Co., Ltd.) and BYK-347 and BYK-348 (products of BYK Additives and Instruments) can be used.

The polyorganosiloxane surfactant preferably contains at least one represented by formula (II)

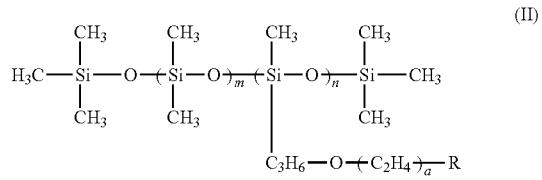

(II)

(wherein R represents a hydrogen atom or a methyl group, a represents an integer of 2 to 13, m represents an integer of 2 to 70, and n represents an integer of 1 to 8) or, more preferably at least one compound represented by formula (II) above but with R representing a hydrogen atom or a methyl group, a representing an integer of 2 to 11, m representing an integer of 2 to 50, and n representing an integer of 1 to 5, or the polyorganosiloxane surfactant more preferably contains at least one compound represented by formula (II) but with R representing a hydrogen atom or a methyl group, a representing an integer of 2 to 13, m representing an integer of 2 to 50, and n representing an integer of 1 to 5. Alternatively, the polyorganosiloxane surfactant more preferably contains at least one compound represented by formula (II) but with R representing a hydrogen atom or a methyl group, a representing an integer of 2 to 13, m representing an integer of 2 to 50, and n representing an integer of 1 to 8. Alternatively, the polyorganosiloxane surfactant preferably contains at least one compound represented by formula (II) but with R representing a methyl group, a representing an integer of 6 to 18, m representing an integer of 0 to 4, and n representing 1 or 2 and more preferably contains at least one compound represented by formula (II) but with R representing a methyl group, a representing an integer of 6 to 18, m representing 0, and n representing 1. When such polyorganosiloxane surfactants are used, nonuniformity of ink aggregation can be improved even when printing is conducted on printing paper as a recording medium.

Among compounds represented by formula (II), a compound with a representing an integer of 2 to 5, m representing an integer of 20 to 40, and n representing an integer of 2 to 4, a compound with a representing an integer of 7 to 11, m representing an integer of 30 to 50, and n representing an integer of 3 to 5, a compound with a representing an integer of 9 to 13, m representing an integer of 2 to 4, and n representing an integer of 1 to 2, and a compound with a representing an integer of 6 to 10, m representing an integer of 10 to 20, and n representing an integer of 4 to 8 are more preferably used. When these compounds are used, the coalescence of the ink can be addressed.

Among the compounds represented by formula (II) above, a compound with R representing a hydrogen atom, a representing an integer of 2 to 5, m representing an integer of 20 to 40, and n representing an integer of 2 to 4 or a representing an integer of 7 to 11, m representing an integer of 30 to 50, and n representing an integer of 3 to 5 is more preferably used. When these compounds are used, the coalescence of the ink and the bleeding can be further suppressed.

Among the compounds represented by formula (II) above, a compound with R representing a methyl group, a representing an integer of 9 to 13, m representing an integer of 2 to 4, and n representing an integer of 1 to 2 or a representing an integer of 6 to 10, m representing an integer of 10 to 20, and n representing an integer of 4 to 8 is more preferably used. When these compounds are used, the coalescence of the ink and the bleeding can be further suppressed.

Among the compounds represented by formula (II) above, a compound with R representing a methyl group, a representing an integer of 6 to 12, m representing 0, and n representing 1 is more preferably used. When such a compound is used, the coalescence of the ink and the bleeding can be further suppressed.

Among compounds represented by formula (II), a mixture containing a compound with R representing a hydrogen atom, a representing an integer of 7 to 11, m representing an integer of 30 to 50, and n representing an integer of 3 to 5, a compound with R representing a methyl group, a representing an integer of 9 to 13, m representing an integer of 2 to 4, and n representing an integer of 1 or 2, and a compound with R representing a methyl group, a representing an integer of 6 to 10, m representing an integer of 10 to 20, and n representing an integer of 4 to 8 is most preferably used. When such a compound used, the coalescence of the ink and the bleeding can be further suppressed.

Among compounds represented by formula (II), a mixture containing a compound with R representing a hydrogen atom, a representing an integer of 7 to 11, m representing an integer of 30 to 50, and n representing an integer of 3 to 5, a compound with R representing a methyl group, a representing an integer of 9 to 13, m representing an integer of 2 to 4, and n representing an integer of 1 or 2, and a compound with R representing a methyl group, a representing an integer of 6 to 18, m representing 0, and n representing 1 is most preferably used. When these compounds are used, the coalescence of the ink and the bleeding can be further suppressed.

The polyorganosiloxane surfactant is not particularly limited but preferably has a dynamic surface tension of 26 mN/m or less at 1 Hz when prepared into an ink composition containing 20 mass % glycerin, 10 mass % 1,2-hexanediol, 0.1 mass % polyorganosiloxane surfactant, and 69.9 mass % water. The dynamic surface tension can be measured with, for example, a bubble pressure tensiometer BP2 (product of KRUSS GmbH).

The surfactant content in the ink composition is preferably 0.01 to 1.0 mass % and more preferably 0.05 to 0.50 mass %. In particular, when a surfactant represented by formula (II) with R representing a hydrogen group is used, it is preferable for the suppression of beading to decrease the amount of such a surfactant compared to when a surfactant represented by formula (II) with R representing a methyl group is used. When 0.01 to 0.1 mass % of a surfactant represented by formula (II) with R representing a hydrogen group is used, water repellency is exhibited and bleeding can be adjusted.

The ink composition may further contain another surfactant, namely, an acetylene glycol surfactant, an anionic surfactant, a nonionic surfactant, an ampholytic surfactant, or the like.

Examples of the acetylene glycol surfactant include 2,4,7,9-tetramethyl-5-decyn-4,7-diol, 3,6-dimethyl-4-octyn-3,6-diol, 3,5-dimethyl-1-hexyn-3-ol, and 2,4-dimethyl-5-hexyn-3-ol. Commercially available products may also be used as the acetylene glycol surfactant. Examples thereof include Olfine E1010, STG, and Y (trade names, products of Nissin Chemical Industry Co., Ltd.), and Surfynol 61, 104, 82, 465, 485, and TG (trade names, products of Air Products and Chemicals Inc.).

Water and Other Components

The ink composition preferably contains water as a solvent in addition to the cyclic saccharide and hydantoin or a derivative thereof. Water is preferably pure water or ultrapure water such as ion exchange water, ultrafiltered water, reverse osmosis water, or distilled water. Any one of these water sterilized by ultraviolet irradiation, hydrogen peroxide addition, or the like is preferred since generation of mold and bacteria can be prevented for a long time.

The ink composition may further contain a penetrant in addition to the components described above. For example, a glycol ether can be used as the penetrant.

Specific examples of the glycol ethers include ethylene glycol monomethyl ether, ethylene glycol monoethyl ether, ethylene glycol mono-iso-propyl ether, ethylene glycol mono-n-butyl ether, ethylene glycol mono-iso-butyl ether, ethylene glycol mono-tert-butyl ether, ethylene glycol monomethyl ether acetate, diethylene glycol monomethyl ether, diethylene glycol monoethyl ether, diethylene glycol mono-n-propyl ether, diethylene glycol mono-iso-propyl ether, diethylene glycol mono-tert-butyl ether, triethylene glycol mono-n-butyl ether, propylene glycol monomethyl ether, propylene glycol monoethyl ether, propylene glycol mono-n-propyl ether, propylene glycol mono-iso-propyl ether, propylene glycol mono-n-butyl ether, propylene glycol mono-tert-butyl ether, dipropylene glycol monomethyl ether, dipropylene glycol monoethyl ether, dipropylene glycol mono-n-propyl ether, dipropylene glycol-iso-propyl ether, dipropylene glycol mono-n-butyl ether, dipropylene glycol mono-tert-butyl ether, 3-methoxy-3-methyl-1-butanol, and 3-methoxy-1-butanol. These may be used alone or as a mixture of two or more.

Of the glycol ethers above, alkyl ethers of polyhydric alcohols are preferred. In particular, ethylene glycol monoethyl ether, ethylene glycol mono-n-butyl ether, diethylene glycol monomethyl ether, diethylene glycol monoethyl ether, propylene glycol monomethyl ether, propylene glycol monoethyl ether, propylene glycol monobutyl ether, triethylene glycol monomethyl ether, triethylene glycol mono-n-butyl ether, and 3-methoxy-1-butanol are preferred. Triethylene glycol monomethyl ether, triethylene glycol mono-n-butyl ether, and 3-methoxy-1-butanol are more preferable.

The amount of the penetrant added may be appropriately determined but is preferably about 0.1 to 30 percent by mass and more preferably about 1 to 20 percent by mass.

The ink composition preferably further contains a recording medium-dissolving agent in addition to the components described above.

Pyrrolidones such as N-methyl-2-pyrrolidone, pyrrolidone carboxylic acid, and their alkali metal salts are preferably used as the recording medium-dissolving agent. The amount of the recording medium-dissolving agent added may be appropriately determined but is preferably about 0.1 to 30 percent by mass and more preferably about 1 to 20 percent by mass.

The ink composition preferably contains a humectant such as glycerin or its derivative, e.g., 3-(2-hydroxyethoxy)-1,2-propanediol (CAS 14641-24-8) or 3-(2-hydroxypropoxy)-1,2-propanediol. Glycerin and its derivatives are preferred since they prevent drying and solidification of inks in ink jet nozzles and improve the clogging recoverability. In this embodiment, 0.1 to 8 mass % of the humectants can be contained.

The ink composition of may further contain a nozzle clogging-preventing agent, a preservative, an antioxidant, a conductivity adjuster, a pH adjuster, a viscosity adjuster, a surface tension adjuster, an oxygen absorber, and the like.

Examples of the preservative and fungicide include sodium benzoate, sodium pentachlorophenol, sodium 2-pyridinethiol-1-oxide, sodium sorbate, sodium dehydroacetate, and 1,2-dibenzylthiazolin-3-one (Proxel CRL, Proxel BND, Proxel GXL, Proxel XL-2, and Proxel TN produced by ICI). The cyclic saccharide contained in the ink composition of the embodiment has a clathration effect and enables the preservative and fungicide to be stably dissolved.

Examples of the pH adjuster, dissolving aid, and antioxidant include amines such as diethanolamine, triethanolamine, propanolamine, and morpholine and their modified products; inorganic salts such as potassium hydroxide, sodium hydroxide, and lithium hydroxide; ammonium hydroxide and quaternary ammonium hydroxide (e.g., tetramethyl ammonium); carbonates such as potassium carbonate, sodium carbonate, and lithium carbonate; phosphates; N-methyl-2-pyrrolidone; ureas such as urea, thiourea, and tetramethylurea; allophanates such as allophanate and methyl allophanate; biurets such as biuret, dimethyl biuret, and tetramethyl biuret; and L-ascorbic acid and salts thereof.

The ink composition may contain an antioxidant and an ultraviolet absorber. Examples thereof include Tinuvin 328, 900, 1130, 384, 292, 123, 144, 622, 770, and 292, Irgacor 252 and 153, and Irganox 1010, 1076, 1035, and MD 1024 produced by Ciba Specialty Chemicals, and oxides of lanthanides.

The ink composition can be manufactured by dispersing and mixing the components described above by adequate techniques. Preferably, first, a pigment, a polymer dispersant, and water are mixed with each other in an adequate dispersing device (e.g., a ball mill, a sand mill, an attritor, a roll mill, an agitator mill, a Henschel mixer, a colloid mill, an ultrasonic homogenizer, a jet mill, or an angstrom mill) to prepare a homogeneous pigment dispersion, and then a resin (resin emulsion) separately prepared, water, a water-soluble organic solvent, a sugar, a pH adjuster, a preservative, a fungicide, and the like are added thereto to be sufficiently dissolved and to thereby prepare an ink solution. After thorough stirring, the mixture is filtered to remove coarse particles and foreign matter that cause clogging to obtain a desired ink composition. The filtration is preferably conducted with a glass fiber filter as a filter. The glass fiber is preferably a resin-impregnated glass fiber from the viewpoint of electrostatic adsorption functions. The pore diameter of the glass fiber filter is preferably 1 to 40 micrometers and more preferably 1 to 10 micrometers from the viewpoints of productivity and removal of charged free resins by adsorption. The ejection stability can be improved by sufficiently removing the charged free resins by adsorption. An example of the filter is Ultipor GF Plus filter produced by Pall Corporation.

Embodiment B

Ink Composition

Components contained in an ink composition according to an embodiment B of the invention will now be described. The ink composition of the embodiment B may contain components that are described as examples of the components of the ink composition of the embodiment A. Descriptions of the components described in relation to the ink composition of the embodiment A are basically omitted below.

The ink composition according to the embodiment B of the invention contains a sparingly water-soluble alkanediol having 7 to 10 carbon atoms, a cyclodextrin, and a hydantoin or a derivative thereof. A high-definition, high-quality image can be formed on various recording media, in particular, a non-water-absorbing or low-water-absorbing recording media by using an ink composition that contains a sparingly water-soluble alkanediol having 7 to 10 carbon atoms, a cyclodextrin, and a hydantoin or a derivative thereof.

In the specification, "beading" means density unevenness in similar colors that occurs locally when an image of one color is printed (e.g., when a 6-inch square image of one color ("one color" means that the number of colors printed is one and two or more ink compositions may be used to realize that color) is printed), and does not mean that some of the recording medium surface remains uncoated with inks. "Bleeding of coloring materials" refers to mixing of colors near the border between images of different colors printed adjacent to each other (e.g., 3-inch square images of different colors are printed next to each other). "Bleeding of solvents" refers to a phenomenon that occurs when images of different colors are printed adjacent to each other (e.g., 3-inch square images of different colors are printed next to each other), where the coating state near the border changes due to migration of coloring materials caused by exudation of solvents, thereby generating density unevenness in similar colors.

In this embodiment, occurrence of curling, i.e., inward warpage of a printed surface, can be suppressed even when printing paper having a paper density of 73.3 to 209.2 $g/m^2$, in particular, thin printing paper having a paper density of 73.3 to 104.7 $g/m^2$, is used as the recording medium.

The reason why a high-quality image with suppressed bleeding and beading can be formed by incorporation of the sparingly water-soluble alkanediol having 7 to 10 carbon atoms, a cyclodextrin, and a hydantoin or a derivative thereof is not clear. However, the following can be presumed.

The cause of the beading of ink that occurs when recording is performed on a recording medium may be that droplets of ink having a surface tension higher than 24 mN/m that have landed on the recording medium move and flow. In other words, presumably, the contact angle of the ink droplet with respect to the recording medium is high and thus the recording medium repels the ink droplets. Accordingly, the surface tension of the ink needs to be decreased to suppress beading. However, when recording is conducted on a non-water-absorbing or low-water-absorbing recording medium, the water contained in the ink is not readily absorbed in the recording medium and thus even droplets of the ink having a surface tension of 20 to 24 mN/m flow and move.

In the specification, the surface tension is a value determined by a Wilhelmy method. The surface tension can be measured by the Wilhelmy method with automatic surface tensiometer CBVP-Z (produced by Kyowa Interface Science Co., Ltd.), for example.

In order to suppress ink beading on a non-water-absorbing or low-water-absorbing recording medium, not only it is preferable to decrease the surface tension of the ink but also it is preferable to suppress flowability after the ink has landed on a recording medium.

It is know that when ink lands on a recording medium, it wets and spreads on the recording medium first and then it penetrates into the recording medium. The cause of the bleeding of ink that occurs when recording is performed on a recording medium may be that droplets of ink having a surface tension higher than 24 mN/m that have landed on the recording medium move and flow. In other words, the cause is presumably that because of the low wettability of the ink for the recording medium, the solvent in the ink does not immediately penetrate into the recording medium. Thus, in order to suppress bleeding, it is necessary to decrease the surface tension of the ink. However, when recording is conducted on a non-water-absorbing or low-water-absorbing recording medium, the water contained in the ink does not readily penetrate into the recording medium and thus even droplets of the ink having a surface tension of 20 to 24 mN/m flow and move.

In order to suppress ink bleeding on a non-water-absorbing or low-water-absorbing recording medium, not only it is preferable to decrease the surface tension of the ink but also it is preferable to suppress flowability after the ink has landed on a recording medium.

It is presumed that, according to the ink composition of the invention, an ink that has a low surface tension and is capable of forming ink droplets, flowability of which is suppressed after landing on the recording medium, can be provided and as a result, bleeding and beading are effectively suppressed.

Sparingly Water-Soluble Alkanediol

The ink composition according to the embodiment B of the invention contains a sparingly water-soluble alkanediol having 7 to 10 carbon atoms (hereinafter this alkanediol is simply referred to as "sparingly water-soluble alkanediol").

According to a preferred embodiment, the sparingly water-soluble alkanediol having 7 to 10 carbon atoms is an alkanediol having an OH group at one end. According to a preferred embodiment, the sparingly water-soluble alkanediol having 7 to 10 carbon atoms is a sparingly water-soluble 1,2-alkanediol that can more effectively suppress beading. Examples of the sparingly water-soluble 1,2-alkanediol include 1,2-heptanediol, 1,2-octanediol, 5-methyl-1,2-hexanediol, 4-methyl-1,2-hexanediol, and 4,4-dimethyl-1,2-pentanediol. Among these, 1,2-octanediol is more preferred.

According to a preferred embodiment, the sparingly water-soluble alkanediol content may be appropriately determined as long as bleeding and beading of ink is efficiently suppressed and a high-quality image can be formed but is preferably 1.0 to 4.0 mass % and more preferably 1.5 to 3.0 mass % relative to the entire composition. When the content of the sparingly water-soluble alkanediol having 7 to 10 carbon atoms is within this range, in particular, not below the lower limit, the bleeding and beading of the ink can be suppressed and a high-quality image can be formed. When the amount of the sparingly water-soluble alkanediol having 7 to 10 carbon atoms is within this range, in particular, not beyond the upper limit, the initial viscosity of the ink does not become excessively high, and separation of the oil layer can be effectively prevented in a normal storing state, which is preferable from the viewpoint of storage property of the ink.

According to a preferred embodiment of the invention, the sparingly water-soluble alkanediol is 1,2-octanediol and the ink composition contains 1.5 to 3.0 mass % of the sparingly water-soluble alkanediol. When the content of the sparingly water-soluble alkanediol is not below the lower limit, the bleeding and beading of the ink can be suppressed. When the content of the sparingly water-soluble alkanediol is not beyond the upper limit, the viscosity of the ink can be suppressed to a low level.

Cyclodextrin

The ink composition of the embodiment B contains the cyclodextrin described in the embodiment A. One or more types of cyclodextrins can be used.

The cyclodextrins used in the embodiment B are not particularly limited but cyclodextrins having one or more substituents are preferred. The substituent is preferably an alkyl group and more preferably a methyl group. In particular, methyl-β-cyclodextrin is preferred since it has a high solubility in water (30 mass % or more at 25° C.) and from the viewpoint of high miscibility with the sparingly water-soluble alkanediol.

According to a preferred embodiment, the ratio of the sparingly water-soluble alkanediol content to the cyclodextrin content is not particularly limited but is preferably 1:3 to 1:6. When the ratio is within the above-described range, the stickiness of the ink can be reduced, the storage stability of the ink is improved, and the re-dissolubility of the ink is improved.

Hydantoin and Hydantoin Derivative

The ink composition according to the embodiment B of the invention contains hydantoin or a derivative thereof described in the embodiment A.

According to the embodiment B, the ratio of the sparingly water-soluble alkanediol content to the content of the hydantoin or a derivative thereof is not particularly limited but is preferably 1:3 to 1:6. At this content ratio, the clogging recoverability in the open system and the clogging recoverability in the closed system can be improved while suppressing beading and bleeding.

Solid Humectant

The ink composition according to the embodiment B of the invention may contain the solid humectants described in the embodiment A. Naturally, at least one of the first saccharide and the second saccharide described in the embodiment A is preferably used as a solid humectant to be used in the ink composition of the embodiment B.

According to the embodiment B, the ratio of the sparingly water-soluble alkanediol content to the solid humectant content is not particularly limited but is preferably 1:3 to 1:9. At this content ratio, the clogging recoverability in the open system and the clogging recoverability in the closed system can be maintained while suppressing beading and bleeding.

Water-Soluble Alkanediol

The ink composition according to the embodiment B of the invention may contain a water-soluble alkanediol described in the embodiment A in addition to a sparingly water-soluble alkanediol having 7 to 10 carbon atoms, a cyclodextrin, and a hydantoin or a derivative thereof. This embodiment is preferred since bleeding of the substances of the ink composition other than the solid matter, i.e., an aqueous solution containing the solvent, can be further suppressed.

Coloring Material

The ink composition according to the embodiment B of the invention may contain the coloring material described in the embodiment A.

Dispersant

The ink composition according to the embodiment B of the invention may contain the dispersant described in the embodiment A to disperse the coloring material.

Surfactant

The ink composition according to the embodiment B of the invention may contain the surfactant described in the embodiment A.

Water and Other Components

The ink composition according to the embodiment B of the invention may contain the surfactant described in the embodiment A.

The ink composition of this embodiment preferably contains water serving as the solvent described in the embodiment A in addition to the above-described sparingly water-soluble alkanediol having 7 to 10 carbon atoms, a cyclic saccharide, and a linear saccharide.

The ink composition preferably further contains the penetrant described in the embodiment A in addition to the above-described components.

The ink compositions of the embodiments A and B are preferably used in ink jet recording.

Ink Jet Recording Method

According to ink jet recording method that uses the ink compositions according to the embodiments A and B of the invention, droplets of the above-mentioned ink composition are ejected and allowed to adhere onto a recording medium to carry out printing. The recording media used in the recording method of the invention are not particularly limited. For example, plain paper, recording media having aqueous-ink-receiving layers, and non-water-absorbing or low-water-absorbing recording media can be used.

Non-Water-Absorbing or Low-Water-Absorbing Recording Media

Examples of the non-water-absorbing recording media include plastic films not surface-treated for ink jet recording (films having no ink receiving layers), and recording media including bases, such as paper sheets, coated with plastic or bonded to plastic films. Examples of the plastic include polyvinyl chloride, polyethylene terephthalate, polycarbonate, polystyrene, polyurethane, polyethylene, and polypropylene.

Examples of the low-water-absorbing recording media include coated papers and recording papers (printing papers)

such as ultra light weight coated paper, art paper, coated paper, matte paper, and cast paper.

Coated papers are papers having surfaces coated with coating materials in order to enhance the aesthetic quality and smoothness. A coating material can be prepared by mixing a pigment such as talc, pyrophyllite, clay (kaolin), titanium oxide, magnesium carbonate, or calcium carbonate, with an adhesive such as starch or polyvinyl alcohol. The coating material is applied by using a machine called a coater during production of the paper. The coater can be of an on-machine type in which the coater is directly connected to a paper machine to perform paper-making and coating in one step or of an off-machine type in which paper-making is conducted separately. Coated papers are mainly used in recording and classified as coated printing papers in the classification of the dynamic statistic of production issued by Ministry of Economy, Trade and Industry.

Ultra light weight coated paper refers to recording paper in which the amount of the coating material applied is 12 g/m² or less. Art paper refers to recording paper produced by applying about 40 g/m² of a coating material to woodfree printing paper (high grade paper, paper containing 100% chemical pulp). Coated paper refers to recording paper produced by applying about 20 g/m² to 40 g/m² of a coating material to the base. Cast paper refers to recording paper produced by pressuring surfaces of art paper or coated paper by using a machine called a cast drum so that the gloss and recording effect are enhanced.

Synthetic paper or printing paper (OKT+ produced by Oji Paper Co., Ltd.) is preferably used as the non-water-absorbing or low-water-absorbing recording medium. In particular, high-quality images with less bleeding and beading can be produced on art paper, high-grade paper for print-on-demand (POD) usage, and special paper for laser printers even when low-resolution printing is conducted. Examples of the high image quality paper for POD usage include Ricoh business coat gloss 100 (produced by Ricoh Company, Ltd.). Examples of the special paper for laser printers include LPC-CTA4 (product of Seiko Epson Corporation). Examples of the waterproof paper include Kareka (product of Mitsubishi Kagaku Media Co., Ltd.) and Laser Peach (product of Nisshinbo Postal Chemical Co., Ltd.).

Varnish Coating

Recorded matter created by using the ink composition of the invention may be over-coated with an offset varnish or a gravure varnish by using a varnish coater used in commercial printing and the like. Variable printing with high image quality and low-volume high-variety printing can be realized through the ink jet recording and high water resistance and solvent resistance can be realized through overcoating with an offset varnish or a gravure varnish.

EXAMPLES

The invention will now be described in detail by way of Examples which do not limit the scope of the invention.

Example A

Preparation of Ink Composition

Components shown in Table 1 below were mixed according to the compositions shown in the table. Each resulting mixture was filtered through a 10 μm membrane filter to prepare an ink. The figures in Table 1 indicate the contents of the components in the ink in terms of percent by mass. In the case of resins, a solid content in terms of percent by mass is indicated. Trehalose in Table 1 was TREHA fine powder produced by Hayashibara Shoji, Inc. The surfactants used in Examples and Comparative Examples were polyorganosiloxane-based surfactants and were composed of a compound represented by formula (II) with R representing a methyl group, a representing an integer of 6 to 18, m representing 0, and n representing 1 (surfactant 1 with R representing methyl), a compound represented by formula (II) with R representing a hydrogen atom, a representing an integer of 7 to 11, m representing an integer of 30 to 50, and n representing an integer of 3 to 5 (surfactant with R representing a hydrogen atom), and a compound represented by formula (II) with R representing a methyl group, a representing an integer of 9 to 13, m representing an integer of 2 to 4, and n representing an integer of 1 to 2 (surfactant 2 with R representing methyl). The surfactant had a dynamic surface tension of 26 mN/m or less at 1 Hz when prepared into an aqueous solution containing 20 mass % glycerin, 10 mass % 1,2-hexanediol, 0.1 mass % the surfactant, and 69.9 mass % water. In particular, the dynamic surface tension at 1 Hz (=One bubble per second) of the aqueous solution measured with a bubble pressure tensiometer BP2 (product of KRUSS GmbH) was 24.6 mN/m.

TABLE 1

| | Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Methylated β-cyclodextrin (*1) | 9 | 9 | 9 | 9 | 4.5 | 4.5 | 4.5 | 4.5 | 9 | 9 | 9 | 9 | 9 | 9 |
| 5,5-Dimethylhydantoin | 4.5 | 4.5 | 4.5 | 4.5 | 9 | 9 | 9 | 9 | 9 | 9 | 9 | 9 | 9 | 9 |
| Triethylene glycol monomethyl ether | 4.5 | 4.5 | 4.5 | 4.5 | 4.5 | 4.5 | 4.5 | 4.5 | 4.5 | 4.5 | 4.5 | 4.5 | 4.5 | 4.5 |
| Trehalose | — | 9 | 4.5 | — | — | 9 | 4.5 | — | — | 9 | 4.5 | — | — | — |
| Maltotriose | 9 | — | 4.5 | — | 9 | — | 4.5 | — | 9 | — | 4.5 | — | — | — |
| Surfactant 1 with R representing methyl | 0.1 | 0.1 | 0.1 | 0.1 | 0.1 | 0.1 | 0.1 | 0.1 | 0.1 | 0.1 | 0.1 | 0.1 | — | — |
| Surfactant 2 with R representing methyl | 0.1 | 0.1 | 0.1 | 0.1 | 0.1 | 0.1 | 0.1 | 0.1 | 0.1 | 0.1 | 0.1 | 0.1 | — | — |
| Surfactant with R representing a hydrogen atom | 0.1 | 0.1 | 0.1 | 0.1 | 0.1 | 0.1 | 0.1 | 0.1 | 0.1 | 0.1 | 0.1 | 0.1 | — | — |
| BYK 348 | — | — | — | — | — | — | — | — | — | — | — | — | 0.3 | — |
| SF465 | — | — | — | — | — | — | — | — | — | — | — | — | — | 0.3 |
| Dispersion (*3) | 45.5 | 45.5 | 45.5 | 45.5 | 45.5 | 45.5 | 45.5 | 45.5 | 45.5 | 45.5 | 45.5 | 45.5 | 45.5 | 45.5 |
| Water | 27.2 | 27.2 | 27.2 | 36.2 | 27.2 | 27.2 | 27.2 | 36.2 | 22.7 | 22.7 | 22.7 | 31.7 | 31.7 | 31.7 |
| Total | 100 | 100 | 100 | 100 | 100 | 100 | 100 | 100 | 100 | 100 | 100 | 100 | 100 | 100 |
| Film line width | A | A | A | A | A | A | A | A | A | A | A | A | A | A |
| Re-dissolubility | A | A | AA | A | A | A | AA | A | A | A | AA | A | A | A |
| Open-system clogging recoverability | AA | A | AA | A | AA | A | AA | A | AA | A | AA | A | A | A |
| Close-system clogging recoverability | B | A | A | B | B | A | A | B | B | A | A | B | B | B |
| Curling property | A | A | A | B | A | A | A | B | A | A | A | B | B | B |

TABLE 1-continued

|  | Comparative Examples | | | | | | | | |
| --- | --- | --- | --- | --- | --- | --- | --- | --- | --- |
|  | 1 | 2 | 3 | 4 | 5 | 6 | 7 | 8 | 9 |
| Methylated β-cyclodextrin (*1) | — | 9 | — | — | — | 9 | 9 | 9 | — |
| Diethylene glycol | — | — | 9 | — | — | — | — | — | 9 |
| Glycerin | — | — | — | 9 | — | — | — | — | — |
| Fructose | — | — | — | — | 9 | — | — | — | — |
| 5,5-Methylhydantoin | 9 | — | 4.5 | 4.5 | 4.5 | — | — | — | — |
| 2-Pyrrolidone | — | — | — | — | — | 4.5 | — | — | 4.5 |
| γ-Butyrolactone | — | — | — | — | — | — | 4.5 | — | — |
| Urea | — | — | — | — | — | — | — | 4.5 | 8 |
| Triethylene glycol monomethyl ether | 4.5 | 4.5 | 4.5 | 4.5 | 4.5 | 4.5 | 4.5 | 4.5 | 4.5 |
| Surfactant 1 with R representing methyl | 0.1 | 0.1 | 0.1 | 0.1 | 0.1 | 0.1 | 0.1 | 0.1 | 0.1 |
| Surfactant 2 with R representing methyl | 0.1 | 0.1 | 0.1 | 0.1 | 0.1 | 0.1 | 0.1 | 0.1 | 0.1 |
| Surfactant with R representing a hydrogen atom | 0.1 | 0.1 | 0.1 | 0.1 | 0.1 | 0.1 | 0.1 | 0.1 | 0.1 |
| Dispersion (*3) | 45.5 | 45.5 | 45.5 | 45.5 | 45.5 | 45.5 | 45.5 | 45.5 | 45.5 |
| Water | 40.7 | 40.7 | 36.2 | 36.2 | 36.2 | 36.2 | 36.2 | 36.2 | 28.2 |
| Total | 100 | 100 | 100 | 100 | 100 | 100 | 100 | 100 | 100 |
| Film line width | B | A | B | B | B | B | B | A | B |
| Re-dissolubility | A | C | A | A | A | A | A | B | A |
| Open-system clogging recoverability | A | B | A | A | A | B | B | B | A |
| Close-system clogging recoverability | B | B | B | B | B | A | A | B | B |
| Curling property | B | B | B | B | A | B | B | B | B |

(*1): Trade name: CAVASOL (R) W7 M (produced by Wacker Chemie AG)
(*2): Trade name: Oligotose (produced by Sanwa Cornstarch Co., Ltd.)
(*3): The dispersion contains 11 mass % pigment, 2.2 mass % styrene-acrylic acid copolymer, 2.2 mass % fluorene resin, 1.1 mass % 1,6-hexanediol, and the balance being water.

In Table 1, "Y" in the ink set below contains C.I. Pigment Yellow 74 as a pigment. "M" contains C.I. Pigment Violet 19 as a pigment. "C" contains C.I. Pigment Blue 15:3 as a pigment. "K" contains C.I. Pigment Black 7 as a pigment.

The "duty" used below is a value calculated from the following equation:

$$\text{Duty}(\%) = \text{Number of actually recorded dots}/(\text{vertical resolution} \times \text{horizontal resolution}) \times 100$$

(In the equation, the "number of actually recorded dots" is a number of actually recorded dots per unit area and the "vertical resolution" and the "horizontal resolution" are each a resolution per unit area.

Evaluation
Evaluation of Curling Property

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible. Recording was conducted at 720 dpi in a main scanning (head driving) direction and at 360 dpi in a sub-scanning (recording medium-feeding) direction. Then the voltage applied to piezoelectric elements of the printer head was adjusted so that the dot side at the time of landing was about 3 ng. A 720×720 dpi image was recorded in one direction on OKT+ (product of Oji Paper Co., Ltd.) having a paper density of about 73.3 g/m² at 720×360 dpi per drive. The recorded image was a solid image with surrounding margins of about 6 mm. Recording was conducted in a normal-temperature, normal-humidity (25° C., 45% RH) environment. The amount of ink of single color that adhered at 100% duty was about 1.6 mg/inch². The recorded matter was left to stand on a flat desk with a recorded surface facing upward in a normal-temperature normal-humidity (25° C., 45% RH) environment for three days. The recorded image was an image of one color. The temperature of the medium at the time of recording was about 20° C. The distance between the recording paper and the recording head was 1 mm.

The obtained image was evaluated according to the following standard.

A: The average of distances of curling from the desk surface to tips of the four corners of the paper was less than 20 mm.

B: The average of distances of curling from the desk surface to tips of the four corners of the paper was 20 mm or more.

The results are indicated in Table 1.

Clogging recoverability in a high-temperature, low-humidity open system (open-system clogging recoverability)

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible. The carriage was moved to an ink cartridge replacement position. The printer was then unplugged. The ink cartridge and then the printer head were removed. The head from which the ink cartridge and the head cap were removed was left to stand in a 40° C., 20% RH environment for 3 days.

Then the head left in the carriage was loaded as before, the ink cartridge which had been left in a normal-temperature, normal-humidity environment was reloaded, and cleaning operation was repeated until all nozzles ejected inks in the same manner as the initial stage. The recoverability was evaluated according to the following standard.

AA: Clogging was resolved by repeating the cleaning operation 6 or less times.

A: Clogging was resolved by repeating the cleaning operation 12 or less times.

B: Clogging was not resolved by repeating the cleaning operation 12 times.

The results are indicated in Table 1.

Clogging Recoverability in a High-Temperature Normal-Humidity Closed System (Close-System Clogging Recoverability)

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible. Then according to a normal procedure, the switch was pressed to turn off the power and the printer was unplugged. The printer with the ink cartridge and the head cap loaded therein was left to stand in a 40° C., 45% RH environment for 7 days.

Then the printer was turned on, and cleaning operation was repeated until all nozzles ejected inks in the same manner as the initial stage. The recoverability was evaluated according to the following standard.

A: Clogging was resolved by repeating the cleaning operation 12 or less times.

B: Clogging was not resolved by repeating the cleaning operation 12 times.

The results are indicated in Table 1.

Evaluation of Film Line Width

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible.

Recording was conducted at 720 dpi in a main scanning (head driving) direction and at 360 dpi in a sub-scanning (recording medium-feeding) direction. Then the voltage applied to piezoelectric elements of the printer head was adjusted so that the dot side at the time of landing was about 3 ng. A 720×180 dpi image of a ruled line extending in the main scanning direction was recorded on Lumirror S10 (100 micrometers in thickness, product of Toray Industries, Inc.) in one direction at 720×360 dpi per drive. The temperature of the medium at the time of recording was about 37° C. The distance between the recording paper and the recording head was 1 mm.

The obtained ruled line was evaluated according to the following standard.

A: The line width was 60 micrometers or more and less than 70 micrometers.

B: The line width was 70 micrometers or more.

The results are indicated in Table 1.

Evaluation of Re-Dissolubility

The inks Y, M, C, and K obtained as above each in an amount of 100 g were respectively placed in 200 ml glass beakers having a diameter of 65 mm. The beakers were left to stand in a 40° C./20% RH environment for 3 days. Then the glass beakers were taken out and cooled by being left in a 20° C./50% RH environment for 3 hours. Solidified inks were deposited on side walls of the glass beakers. The glass beakers were tilted by 45°, retained thereat for 10 seconds, and then untilted. This experiment was used to evaluate the re-dissolubility by repeatedly causing the solidified inks adhering to the side walls of the glass beakers to come into contact for 10 seconds with the 20° C. ink remaining on the bottoms of the glass beakers.

AA: The solidified ink was redissolved and adhering solidified ink disappeared after the first cycle (after 10 seconds).

A: The solidified ink was redissolved and adhering solidified ink disappeared after the second cycle (after 20 seconds).

B: The solidified ink remained after the second cycle (after 20 seconds) but the solidified ink on the side wall was redissolved and disappeared after the third cycle (after 30 seconds).

C: The solidified ink remained on the side walls after the third cycle (after 30 seconds).

The results are indicated in Table 1.

Ink compositions and ink sets of Examples were respectively obtained in the same manner except that 1,6-hexanediol used as a resin-dissolving agent contained in making the dispersant was changed to 1,2-hexanediol. The curling property, the open-system clogging recoverability, the close-system clogging recoverability, the film line width, and the re-dissolubility were evaluated as described above. The evaluation results were the same even when 1,6-hexanediol was changed to 1,2-hexanediol.

Ink compositions and ink sets of Examples were respectively obtained in the same manner except that the styrene-acrylic acid copolymer which is a dispersed resin contained in making the dispersion was changed to an oxyethyl resin. The curling property, the open-system clogging recoverability, the close-system clogging recoverability, the film line width, and the re-dissolubility were evaluated as described above. The evaluation results were the same even when the styrene-acrylic acid copolymer was changed to the oxyethyl resin.

Example B

Preparation of Ink Composition

Components shown in Tables 2 and 3 below were mixed according to the compositions shown in the tables. Each resulting mixture was filtered through a 10 μm membrane filter to prepare an ink. The figures in Tables 2 and 3 indicate the contents of the components in the ink in terms of percent by mass. In the case of resins, a solid content in terms of percent by mass is indicated. Trehalose in Tables 2 and 3 was TREHA fine powder produced by Hayashibara Shoji, Inc. The surfactants used in Examples and Comparative Examples were polyorganosiloxane-based surfactants and were composed of a compound represented by formula (II) with R representing a methyl group, a representing an integer of 6 to 18, m representing 0, and n representing 1 (surfactant 1 with R representing methyl), a compound represented by formula (II) with R representing a hydrogen atom, a representing an integer of 7 to 11, m representing an integer of 30 to 50, and n representing an integer of 3 to 5 (surfactant with R representing a hydrogen atom), and a compound represented by formula (II) with R representing a methyl group, a representing an integer of 9 to 13, m representing an integer of 2 to 4, and n representing an integer of 1 to 2 (surfactant 2 with R representing methyl). The surfactant had a dynamic surface tension of 26 mN/m or less at 1 Hz when prepared into an aqueous solution containing 20 mass % glycerin, 10 mass % 1,2-hexanediol, 0.1 mass % the surfactant, and 69.9 mass % water. In particular, the dynamic surface tension at 1 Hz (=One bubble per second) of the aqueous solution measured with a bubble pressure tensiometer BP2 (product of KRUSS GmbH) was 24.6 mN/m.

TABLE 2

|  | Examples | | | | | | | | | | | | | | Comparative Examples | | |
|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 1 | 2 | 3 |
| Methylated β-cyclodextrin (*1) | 9 | 9 | 9 | 9 | 4.5 | 4.5 | 4.5 | 4.5 | 9 | 9 | 9 | 9 | 9 | 9 | 0 | 9 | 9 |
| 1,2-Octanediol | 1.5 | 1.5 | 1.5 | 1.5 | 1.5 | 1.5 | 1.5 | 1.5 | 3 | 3 | 3 | 3 | 3 | 3 | 3 | 0 | 3 |
| 5,5-Dimethylhydantoin | 4.5 | 4.5 | 4.5 | 4.5 | 9 | 9 | 9 | 9 | 9 | 9 | 9 | 9 | 9 | 9 | 9 | 9 | 0 |
| Triethylene glycol monomethyl ether | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 | 4.5 |
| Trehalose | 0 | 9 | 4.5 | 0 | 0 | 9 | 4.5 | 0 | 0 | 9 | 4.5 | 0 | 0 | 0 | 0 | 0 | 0 |
| Maltotriose (2*) | 9 | 0 | 4.5 | 0 | 9 | 0 | 4.5 | 0 | 9 | 0 | 4.5 | 0 | 0 | 0 | 0 | 0 | 0 |
| Surfactant 1 with R representing methyl | 0.1 | 0.1 | 0.1 | 0.1 | 0.1 | 0.1 | 0.1 | 0.1 | 0.1 | 0.1 | 0.1 | 0.1 | 0 | 0 | 0.1 | 0.1 | 0.1 |
| Surfactant 2 with R representing methyl | 0.1 | 0.1 | 0.1 | 0.1 | 0.1 | 0.1 | 0.1 | 0.1 | 0.1 | 0.1 | 0.1 | 0.1 | 0 | 0 | 0.1 | 0.1 | 0.1 |
| Surfactant with R representing a hydrogen atom | 0.1 | 0.1 | 0.1 | 0.1 | 0.1 | 0.1 | 0.1 | 0.1 | 0.1 | 0.1 | 0.1 | 0.1 | 0 | 0 | 0.1 | 0.1 | 0.1 |
| BYK 348 | 0 | 0 | 0 | 0 | 0 | 0 | 0 | 0 | 0 | 0 | 0 | 0 | 0.3 | 0 | 0 | 0 | 0 |
| SF465 | 0 | 0 | 0 | 0 | 0 | 0 | 0 | 0 | 0 | 0 | 0 | 0 | 0 | 0.3 | 0 | 0 | 0 |
| Dispersion (*3) | 45.5 | 45.5 | 45.5 | 45.5 | 45.5 | 45.5 | 45.5 | 45.5 | 45.5 | 45.5 | 45.5 | 45.5 | 45.5 | 45.5 | 45.5 | 45.5 | 45.5 |
| Water | 25.7 | 25.7 | 25.7 | 34.7 | 25.7 | 25.7 | 25.7 | 34.7 | 19.7 | 19.7 | 19.7 | 28.7 | 28.7 | 28.7 | 37.7 | 31.7 | 37.7 |
| Total | 100 | 100 | 100 | 100 | 100 | 100 | 100 | 100 | 100 | 100 | 100 | 100 | 100 | 100 | 100 | 100 | 100 |

|  | Examples | | | | | | | | | | | | | | Comparative Examples | | |
|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 1 | 2 | 3 |
| Curling property | A | A | A | B | A | A | A | B | A | A | A | B | B | B | B | B | B |
| Open-system clogging recoverability | AA | A | AA | A | AA | A | AA | A | AA | A | AA | A | A | A | A | A | B |
| Close-system clogging recoverability | B | A | B | B | A | A | B | B | A | A | B | B | B | B | B | B | B |
| Storage stability (ink) | A | A | A | A | A | A | A | A | A | A | A | A | A | A | B | A | A |
| Film line width | A | A | A | A | A | A | A | A | A | A | A | A | A | A | B | A | A |
| Re-dissolubility | A | A | AA | A | A | A | A | A | A | A | A | A | A | A | C | A | C |
| Beading property of film | A | A | A | A | A | A | A | A | A | A | A | A | B | B | B | C | A |
| Bleeding property of film | A | A | A | A | A | A | A | A | A | A | A | A | B | B | B | C | A |

(*1): Trade name: CAVASOL (R) W7 M (produced by Wacker Chemie AG)
(*2): Trade name: Oligotose (produced by Sanwa Cornstarch Co., Ltd.)
(*3): The dispersion contains 11 mass % pigment, 2.2 mass % styrene-acrylic acid copolymer, 2.2 mass % fluorene resin, 1.1 mass % 1,6-hexanediol, and the balance being water.

TABLE 3

|  | Examples | | | | | | | | | | | | | |
|---|---|---|---|---|---|---|---|---|---|---|---|---|---|---|
|  | 15 | 16 | 17 | 18 | 19 | 20 | 21 | 22 | 23 | 24 | 25 | 26 | 27 | 28 |
| Methylated β-cyclodextrin (*1) | 9 | 9 | 9 | 9 | 4.5 | 4.5 | 4.5 | 4.5 | 9 | 9 | 9 | 9 | 9 | 9 |
| 1,2-Octanediol | 1.5 | 1.5 | 1.5 | 1.5 | 1.5 | 1.5 | 1.5 | 1.5 | 3 | 3 | 3 | 3 | 3 | 3 |
| 5,5-Dimethylhydantoin | 4.5 | 4.5 | 4.5 | 4.5 | 9 | 9 | 9 | 9 | 9 | 9 | 9 | 9 | 9 | 9 |
| 3-Methoxy-1-butanol | 4.5 | 4.5 | 4.5 | 4.5 | 4.5 | 4.5 | 4.5 | 4.5 | 4.5 | 4.5 | 4.5 | 4.5 | 4.5 | 4.5 |
| Trehalose | 0 | 9 | 4.5 | 0 | 0 | 9 | 4.5 | 0 | 0 | 9 | 4.5 | 0 | 0 | 0 |
| Maltotriose (2*) | 9 | 0 | 4.5 | 0 | 9 | 0 | 4.5 | 0 | 9 | 0 | 4.5 | 0 | 0 | 0 |
| Surfactant 1 with R representing methyl | 0.1 | 0.1 | 0.1 | 0.1 | 0.1 | 0.1 | 0.1 | 0.1 | 0.1 | 0.1 | 0.1 | 0.1 | 0 | 0 |
| Surfactant 2 with R representing methyl | 0.1 | 0.1 | 0.1 | 0.1 | 0.1 | 0.1 | 0.1 | 0.1 | 0.1 | 0.1 | 0.1 | 0.1 | 0 | 0 |
| Surfactant with R representing a hydrogen atom | 0.1 | 0.1 | 0.1 | 0.1 | 0.1 | 0.1 | 0.1 | 0.1 | 0.1 | 0.1 | 0.1 | 0.1 | 0 | 0 |
| BYK 348 | 0 | 0 | 0 | 0 | 0 | 0 | 0 | 0 | 0 | 0 | 0 | 0 | 0.3 | 0 |
| SF465 | 0 | 0 | 0 | 0 | 0 | 0 | 0 | 0 | 0 | 0 | 0 | 0 | 0 | 0.3 |
| Dispersion (*3) | 45.5 | 45.5 | 45.5 | 45.5 | 45.5 | 45.5 | 45.5 | 45.5 | 45.5 | 45.5 | 45.5 | 45.5 | 45.5 | 45.5 |
| Water | 25.7 | 25.7 | 25.7 | 34.7 | 25.7 | 25.7 | 25.7 | 34.7 | 19.7 | 19.7 | 19.7 | 28.7 | 28.7 | 28.7 |
| Total | 100 | 100 | 100 | 100 | 100 | 100 | 100 | 100 | 100 | 100 | 100 | 100 | 100 | 100 |

|  | Examples | | | | | | | | | | | | | |
|---|---|---|---|---|---|---|---|---|---|---|---|---|---|---|
|  | 15 | 16 | 17 | 18 | 19 | 20 | 21 | 22 | 23 | 24 | 25 | 26 | 27 | 28 |
| Curling property | A | A | A | B | A | A | A | B | A | A | A | B | B | B |
| Open-system clogging recoverability | AA | A | AA | A | AA | A | AA | A | AA | A | AA | A | A | A |
| Close-system clogging recoverability | B | A | B | B | A | A | B | B | A | A | B | B | B | B |
| Storage stability (ink) | A | A | A | A | A | A | A | A | A | A | A | A | A | A |
| Film line width | A | A | A | A | A | A | A | A | A | A | A | A | A | A |
| Re-dissolubility | A | A | AA | A | A | A | A | A | A | A | A | A | A | A |

TABLE 3-continued

| Beading property of film | A | A | A | A | A | A | A | A | A | A | A | A | B | B |
|---|---|---|---|---|---|---|---|---|---|---|---|---|---|---|
| Bleeding property of film | A | A | A | A | A | A | A | A | A | A | A | A | B | B |

(*1): Trade name: CAVASOL (R) W7 M (produced by Wacker Chemie AG)
(*2): Trade name: Oligotose (produced by Sanwa Cornstarch Co., Ltd.)
(*3): The dispersion contains 11 mass % pigment, 2.2 mass % styrene-acrylic acid copolymer, 2.2 mass % fluorene resin, 1.1 mass % 1,6-hexanediol, and the balance being water.

In Tables 2 and 3, "Y" in the ink set below contains C.I. Pigment Yellow 74 as a pigment. "M" contains C.I. Pigment Violet 19 as a pigment. "C" contains C.I. Pigment Blue 15:3 as a pigment. "K" contains C.I. Pigment Black 7 as a pigment.

The "duty" used below is a value calculated from the following equation:

$$\text{Duty}(\%) = \text{Number of actually recorded dots}/(\text{vertical resolution} \times \text{horizontal resolution}) \times 100$$

(In the equation, the "number of actually recorded dots" is a number of actually recorded dots per unit area and the "vertical resolution" and the "horizontal resolution" is each a resolution per unit area.

Evaluation

Evaluation of Curling Property

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible. Recording was conducted at 720 dpi in a main scanning (head driving) direction and at 360 dpi in a sub-scanning (recording medium-feeding) direction. Then the voltage applied to piezoelectric elements of the printer head was adjusted so that the dot side at the time of landing was about 3 ng. A 720×720 dpi image was recorded in one direction on OKT+ (product of Oji Paper Co., Ltd.) having a paper density of about 73.3 g/m2 at 720×360 dpi per drive. The recorded image was a solid image with surrounding margins of about 6 mm. Recording was conducted in a normal-temperature, normal-humidity (25° C., 45% RH) environment. The amount of ink of single color that adhered at 100% duty was about 1.6 mg/inch². The recorded matter was left to stand on a flat desk with a recorded surface facing upward in a normal-temperature normal-humidity (25° C., 45% RH) environment for three days. The recorded image was an image of one color. The temperature of the medium at the time of recording was about 20° C. The distance between the recording paper and the recording head was 1 mm.

The obtained image was evaluated according to the following standard.
   A: The average of distances of curling from the desk surface to tips of the four corners of the paper was less than 20 mm.
   B: The average of distances of curling from the desk surface to tips of the four corners of the paper was 20 mm or more.

The results are indicated in Tables 2 and 3.

Clogging Recoverability in a High-Temperature, Low-Humidity Open System (Open-System Clogging Recoverability)

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible. The carriage was moved to an ink cartridge replacement position. The printer was then unplugged. The ink cartridge and then the printer head were removed. The head from which the ink cartridge and the head cap were removed was left to stand in a 40° C., 20% RH environment for 3 days.

Then the head left in the carriage was loaded as before, the ink cartridge which had been left in a normal-temperature, normal-humidity environment was reloaded, and cleaning operation was repeated until all nozzles ejected inks in the same manner as the initial stage. The recoverability was evaluated according to the following standard.
   AA: Clogging was resolved by repeating the cleaning operation for 6 or less times.
   A: Clogging was resolved by repeating the cleaning operation for 12 or less times.
   B: Clogging was not resolved by repeating the cleaning operation for 12 times. The results are indicated in Tables 2 and 3.

Clogging Recoverability in a High-Temperature Normal-Humidity Closed System (Close-System Clogging Recoverability)

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible. Then according to a normal procedure, the switch was pressed to turn off the power and the printer was unplugged. The printer with the ink cartridge and the head cap loaded therein was left to stand in a 40° C., 45% RH environment for 7 days.

Then the printer was turned on, and cleaning operation was repeated until all nozzles ejected inks in the same manner as the initial stage. The recoverability was evaluated according to the following standard.
   A: Clogging was resolved by repeating the cleaning operation 12 or less times.
   B: Clogging was not resolved by repeating the cleaning operation 12 times.

The results are indicated in Tables 2 and 3.

Evaluation of Storage Stability (Ink)

The viscosities of the inks Y, M, C, and K obtained as above was were measured at 20° C. and assumed to be the initial viscosities. Then each ink in an amount of 100 g was placed in a 110 ml LABORAN sample bottle (produced by ASONE Corporation) and a lid was placed. The bottle was left at 70° C. for one week and then left to stand to cool to 20° C. The viscosity of the ink after being left at 20° C. was measured.
   A: The change in viscosity was less than 0.4 mPas.
   B: The change in viscosity was 0.4 mPas or more and less than 0.8 mPas.

The results are indicated in Tables 2 and 3.

Evaluation of Film Line Width

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible.

Recording was conducted at 360 dpi in a main scanning (head driving) direction and at 720 dpi in a sub-scanning (recording medium-feeding) direction. Then the voltage applied to piezoelectric elements of the printer head was adjusted so that the dot side at the time of landing was about 3 ng. A 720×180 dpi image of a ruled line extending in the main scanning direction was recorded on Lumirror S10 (100 micrometers in thickness, product of Toray Industries, Inc.) in one direction at 720×360 dpi per drive. The temperature of the medium at the time of recording was about 37° C. The distance between the recording paper and the recording head was 1 mm.

The obtained ruled line was evaluated according to the following standard.
   A: The line width was 60 micrometers or more and less than 70 micrometers.
   B: The line width was 70 micrometers or more.
The results are indicated in Tables 2 and 3.
Evaluation of Re-Dissolubility The inks Y, M, C, and K obtained as above each in an amount of 100 g were respectively placed in 200 ml glass beakers having a diameter of 65 mm. The beakers were left to stand in a 40° C./20% RH environment for 3 days. Then the glass beakers were taken out and cooled by being left in a 20° C./50% RH environment for 3 hours. Solidified inks were deposited on side walls of the glass beakers. The glass beakers were tilted by 45°, retained thereat for 10 seconds, and then untilted. This experiment was used to evaluate the re-dissolubility by repeatedly causing the solidified inks adhering to the side walls of the glass beakers to come into contact for 10 seconds with the 20° C. ink remaining on the bottoms of the glass beakers.
   AA: The solidified ink was redissolved and adhering solidified ink disappeared after the first cycle (after 10 seconds).
   A: The solidified ink was redissolved and adhering solidified ink disappeared after the second cycle (after 20 seconds).
   B: The solidified ink remained after the second cycle (after 20 seconds) but the solidified ink on the side wall was redissolved and disappeared after the third cycle (after 30 seconds).
   C: The solidified ink remained on the side walls after the third cycle (after 30 seconds).
The results are indicated in Tables 2 and 3.
Evaluation of Ink Beading (Image Quality) on Films (Beading Property)

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible.

Recording was conducted at 720 dpi in a main scanning (head driving) direction and at 360 dpi in a sub-scanning (recording medium-feeding) direction. Then the voltage applied to piezoelectric elements of the printer head was adjusted so that the dot side at the time of landing was about 3 ng. A 1440×720 dpi image was recorded on Lumirror S10 (100 micrometers in thickness, product of Toray Industries, Inc.) in one direction at 720×360 dpi per drive. The amount of ink of single color that adhered at 100% duty was 3.1 mg/inch$^2$. The temperature of the medium at the time of recording was about 37° C.

The distance between the recording paper and the recording head was 1 mm. The recorded image was an image of a secondary color formed by mixing single colors at the same duty.

The obtained image was evaluated according to the following standard.
   A: Up to a 160% duty secondary color constituted by 80% duty single colors was reproduced without beading.
   B: Up to a 120% duty secondary color constituted by 60% duty single colors was reproduced without beading. However, a 160% duty secondary color constituted by 80% duty single colors could not be reproduced due to beading.
   C: Up to a 80% duty secondary color constituted by 40% duty single colors was reproduced without beading. However, a 120% duty secondary color constituted by 60% duty single colors could not be reproduced due to beading.
The results are indicated in Tables 2 and 3.
Evaluation of Ink Bleeding (Image Quality) on Films (Bleeding Property)

An ink set including Y, M, C, and K inks obtained as above was prepared and charged into an ink cartridge of an ink jet printer (PXG 930 product of Seiko Epson Corporation). The cartridge was loaded in the printer. The order in which the inks were loaded was YYMMCCKK with Y being farthest from the cap and K being the nearest to the cap. Inks were then charged in a printer head using a printer driver and it was confirmed that normal recording was possible.

Recording was conducted at 720 dpi in a main scanning (head driving) direction and at 360 dpi in a sub-scanning (recording medium-feeding) direction. Then the voltage applied to piezoelectric elements of the printer head was adjusted so that the dot side at the time of landing was about 3 ng. A 1440×720 dpi image was recorded on Lumirror S10 (100 micrometers in thickness, product of Toray Industries, Inc.) in one direction at 720×360 dpi per drive. The amount of ink of single color that adhered at 100% duty was 3.1 mg/inch$^2$, for example. The temperature of the medium at the time of recording was about 37° C.

The distance between the recording paper and the recording head was 1 mm. The recorded image was an image formed by bringing a duty 160% secondary color constituted by duty 80% single colors into contact with 2-8 pixel ruled lines of a duty 80% primary color.

The obtained image was evaluated according to the following standard.
   A: $6/720$ inch ruled lines were reproduced without bleeding but $2/720$ inch ruled lines could not be reproduced due to bleeding.
   B: $10/720$ inch ruled lines were reproduced without bleeding but $6/720$ inch ruled lines could not be reproduced due to bleeding.
   C: Ruled lines were not obtained due to discharge failure.
The results are indicated in Tables 2 and 3.

Ink compositions and ink sets of Examples were respectively obtained in the same manner except that 1,6-hexanediol used as a resin-dissolving agent contained in making the dispersion was changed to 1,2-hexanediol. The curling property, the open-system clogging recoverability, the close-system clogging recoverability, the storage stability (ink), the film line width, the re-dissolubility, the beading property, and the bleeding property were evaluated as described above. The evaluation results were the same even when 1,6-hexanediol was changed to 1,2-hexanediol.

Ink compositions and ink sets of Examples were respectively obtained in the same manner except that the styrene-acrylic acid copolymer which is a dispersed resin contained in making the dispersant was changed to an oxyethyl resin. The curling property, the open-system clogging recoverability, the close-system clogging recoverability, the storage stability (ink), the film line width, the re-dissolubility, the beading property, and the bleeding property were evaluated as described above. The evaluation results were the same even when the styrene-acrylic acid copolymer was changed to the oxyethyl resin.

What is claimed is:

1. An ink composition comprising:
   a cyclic saccharide; and
   hydantoin or a derivative thereof,
   wherein the hydantoin derivative is 5,5-dimethylhydantoin or 1-hydroxymethyl-5,5-dimethylhydantoin.

2. The ink composition according to claim 1, wherein the cyclic saccharide is a cyclodextrin.

3. The ink composition according to claim 1, further comprising a solid humectant which is solid at 20° C. and a relative humidity of 60%.

4. The ink composition according to claim 3, wherein the solid humectant contains at least one selected from the group consisting of a first saccharide and a second saccharide;
   the first saccharide is at least one selected from the group consisting of trehalose, isotrehalose, neotrehalose, and mannitol; and
   the second saccharide is at least one selected from the group consisting of maltotriose, maltotetraose, and maltopentaose.

5. An ink composition comprising:
   a sparingly water-soluble alkanediol having 7 to 10 carbon atoms;
   a cyclodextrin; and
   hydantoin or a derivative thereof,
   wherein the hydantoin derivative is 5,5-dimethylhydantoin or 1-hydroxymethyl-5,5-dimethylhydantoin.

6. The ink composition according to claim 5, wherein the ratio of a content of the sparingly water-soluble alkanediol having 7 to 10 carbon atoms to a content of the cyclodextrin is 1:3 to 1:6.

7. The ink composition according to claim 5, further comprising a solid humectant which is solid at 20° C. and a relative humidity of 60%.

8. The ink composition according to claim 7, wherein the solid humectant contains at least one selected from the group consisting of a first saccharide and a second saccharide;
   the first saccharide is at least one selected from the group consisting of trehalose, isotrehalose, neotrehalose, and mannitol; and
   the second saccharide is at least one selected from the group consisting of maltotriose, maltotetraose, and maltopentaose.

* * * * *